(12) United States Patent
Zhuang et al.

(10) Patent No.: US 9,835,887 B2
(45) Date of Patent: Dec. 5, 2017

(54) DISPLAY SYSTEM WITH INDEPENDENTLY CONTROLLED TRANSMISSIVE AND REFLECTIVE SUBPIXELS AND METHOD OF USE

(71) Applicant: Motorola Mobility LLC, Libertyville, IL (US)

(72) Inventors: Li Zhuang, Long Grove, IL (US); Ross W Ripley, Gurnee, IL (US); Sen Yang, Palatine, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 337 days.

(21) Appl. No.: 14/186,391

(22) Filed: Feb. 21, 2014

(65) Prior Publication Data
US 2015/0241725 A1  Aug. 27, 2015

(51) Int. Cl.
*G02F 1/1335* (2006.01)
*G02F 1/133* (2006.01)
(Continued)

(52) U.S. Cl.
CPC ........ *G02F 1/13306* (2013.01); *G02F 1/1368* (2013.01); *G02F 1/13338* (2013.01);
(Continued)

(58) Field of Classification Search
CPC ................................................ G02F 1/133555
See application file for complete search history.

(56) References Cited

U.S. PATENT DOCUMENTS 7,564,530 B2   7/2009  Hu et al.
7,728,944 B2   6/2010  Hu et al.
(Continued)

FOREIGN PATENT DOCUMENTS

EP      2096489 A1   9/2009
EP      1783543 B1   1/2010
JP      2012032801 A  2/2012

OTHER PUBLICATIONS

Uiyeong Cha et al., "Transflective LCD with Cholesteric White Reflector", http://ddlab.hanyang.ac.kr/inner_image/publication/proceeding/217.pdf, 2011, 3 pages, vol. 13.
(Continued)

*Primary Examiner* — Nathanael R Briggs
*Assistant Examiner* — Alexander Gross
(74) *Attorney, Agent, or Firm* — Morris & Kamlay LLP

(57) ABSTRACT

A device (100) includes a display (102, 800) that is suitable for use under widely ranging lighting conditions. The display includes separately operable transmissive light modulator subpixels (402, 404, 406, 502, 504, 506, 602, 604, 606, 702, 704, 706, 808, 810, 812, 1036, 1136, 1204, 1304, 1404, 1504, 1716, 1916) that can be provided in at least three colors to provide a full color display but also includes separately operable reflective light modulator subpixels (408, 508, 608, 708, 814, 1038, 1138, 1202, 1302, 1402, 1502, 1714, 1914) that provide basic readability when light levels are so high (e.g., bright summer day) that the image presented by the transmissive light modulators would be difficult to discern. The reflective light modulators may be provided with in-pixel memory (526) so as to reduce the energy cost of providing always-on functioning for displaying certain time sensitive information.

6 Claims, 14 Drawing Sheets

(51) Int. Cl.
| | |
|---|---|
| *G02F 1/1333* | (2006.01) |
| *G02F 1/1343* | (2006.01) |
| *G02F 1/1368* | (2006.01) |
| *G09G 3/34* | (2006.01) |
| *G09G 3/36* | (2006.01) |
| *G02F 1/1362* | (2006.01) |

(52) U.S. Cl.
CPC .... *G02F 1/13624* (2013.01); *G02F 1/133553* (2013.01); *G02F 1/133555* (2013.01); *G02F 1/134309* (2013.01); *G02F 1/136286* (2013.01); *G09G 3/3406* (2013.01); *G09G 3/3607* (2013.01); *G09G 3/3696* (2013.01); *G02F 2001/134345* (2013.01); *G02F 2201/52* (2013.01); *G09G 2300/0434* (2013.01); *G09G 2300/0456* (2013.01); *G09G 2330/022* (2013.01); *G09G 2360/144* (2013.01)

(56) References Cited

U.S. PATENT DOCUMENTS

| | | | |
|---|---|---|---|
| 8,488,088 | B2 | 7/2013 | Chen et al. |
| 2008/0074592 | A1 | 3/2008 | Araki et al. |
| 2009/0195565 | A1 | 8/2009 | Kimura |
| 2010/0077234 | A1* | 3/2010 | Das ........................ G06F 1/3203 713/300 |
| 2010/0220096 | A1* | 9/2010 | Hyytiainen ....... G02F 1/133555 345/214 |
| 2010/0231614 | A1 | 9/2010 | Vieri et al. |
| 2010/0257490 | A1* | 10/2010 | Lyon .................... G06F 3/0488 715/863 |
| 2011/0285684 | A1* | 11/2011 | Lu .................... G02F 1/133371 345/211 |
| 2012/0127140 | A1* | 5/2012 | Ryan .................... G09G 3/3648 345/207 |
| 2012/0268502 | A1 | 10/2012 | Kurasawa et al. |
| 2012/0280917 | A1* | 11/2012 | Toksvig ................ G06F 1/1626 345/173 |

OTHER PUBLICATIONS

Yoshi Ohno, "Calculation of CCT and DUV and Practical Conversion Formulae", Council for Optical Radiation Measurements 2011 Conference, http://www.cormusa.org/uploads/CORM_2011_Calculation_of_CCT_and_Duv_and_Practical_Conversion_Formulae.PDF, May 3, 2011, 28 pages, Gaithersburg MD USA.

Robert H. Chen, "Liquid Crystal Displays: Fundamental Physics and Technology", Aug. 4, 2011, p. 462, accessed by http://books.google.com/books?id=X8u8BdIKRQ8C&pg=PA462&lpg=PA462&dq=dual+gap+transflective+display+field+distortion&source=bl&ots=b4qrh1oO0s&sig=ggiHlmAQGmRzCfl2LZOuoDHy4mU&hl=en&sa=X&ei=OtJ7UvOBJe2GyQGUvoGYDQ&ved=0CC0Q6AEwAA#v=onepage&q=dual%20gap%20transflective%20display%20field%20distortion&f=false.

Koichi Fujimori et al., "High-Transmissive Advanced TFT LCD Technology", http://www.sharp-world.com/corporate/info/rd/tj4/pdf/8.pdf, Mar. 3, 2003, 5 pages.

Li-Wei Chu et al., "Design of Analog Pixel Memory for Low Power Application in TFT-LCDs", J. of Display Tech, Feb. 2011, pp. 62-69, vol. 7 No. 2.

Takahiro Ochiai et al., "34.5L: Late-News Paper: Low Cost Retarder-less Transflective IPS-LCD", Soc. For Info. Display Digest, 2007, pp. 1258-1261.

Choichi Hirota et al., "57.4L: Late-News Paper: Transflective LCD Combining Transmissive IPS and Reflective In-Cell Retarder ECB", Soc. for Info. Display Digest, 2007, pp. 1661-1664.

Young Jin Lim et al., "High Performance Transflective Liquid Crystal Display Associated with Fringe-Field Switching Device", Optics Express, Apr. 12, 2011, pp. 8085-8091, vol. 19 No. 9.

PCT Invitation to Pay Additional Fees and Partial ISR issued in Application No. PCT/US2015/016535 dated Mar. 31, 2015.

IPRP dated Aug. 23, 2016 as received in Application No. PCT/US2015/016535.

* cited by examiner

DISPLAY SYSTEM WITH INDEPENDENTLY CONTROLLED TRANSMISSIVE AND REFLECTIVE SUBPIXELS AND METHOD OF USE

FIELD

The present specification relates generally to display technology. More particularly the present specification relates to liquid crystal display technology.

BACKGROUND

Smartphone and tablet computers support powerful, versatile computing and communication. These portable electronic devices can run thousands of different software applications ("apps"), which are a great convenience to users. A person can easily carry such devices and use them whenever and wherever the need arises. However, one important limitation of such devices lies in the display technology. In order to provide readability in low to moderate light conditions smartphones and tablets use emissive displays, such as Liquid Crystal Displays (LCDs) or Active Matrix Organic Light Emitting Diode (AMOLED) displays.

However given the finite efficiency of such displays in converting electrical energy to visible light and given the necessarily limited electrical energy storage (e.g., battery capacity) of portable devices, as a practical matter there is an imposed limit on the brightness and usage per charge of LCD and AMOLED displays. The brightness limits become problematic when using the devices outdoors on bright sunny days. Under such ambient lighting conditions, the unwanted inherent reflectivity of the display in combination with the high ambient light illuminance on the display surface may lead to the displayed image or text being 'washed out' and difficult to discern.

In the past, transflective displays have been used on a limited basis. Like other LCD displays, a transflective display includes a 2-D array of pixels and each pixel includes multiple subpixels, for example red, blue and green subpixels. In a transflective display, each subpixel is divided into two parts such that it includes a reflective part and a transmissive part. As in other LCD displays, electric voltages are used to alter the configuration (e.g., the molecular long axis orientation) of the liquid crystals in the display to modulate the passage of light through the display. In the reflective portion, light traverses the liquid crystal twice—once going in and once going out after reflection. On the other hand in the transmissive portion, light from a back light located behind the display traverses the liquid crystal only once on the way out of the display.

In order to try to equalize the effect of electric voltage-induced alteration of the liquid crystal on the light in transmissive and reflective portions, one inside surface of the transflective display is corrugated so that the depth of liquid crystal material in the reflective portion will be half of the depth of liquid crystal material in the transmissive portion thereby equalizing the optical path length through the liquid crystal for transmitted light and reflected light. The step-change in depth creates a distorted region of liquid crystal which lowers display contrast. Additionally, there remains a difference in the voltage to brightness (input-output) functions for the two portions of each transflective subpixel which limits display fidelity.

Recently there has been a trend toward very high resolution displays. Pixel densities greater than 300 pixels per inch (ppi) are not uncommon and significantly higher pixel densities are on the horizon. At such high densities, the distorted region that reduces contrast would have an increased relative size, thereby leading to further reduced contrast. Therefore a solution that provides the benefits of transflective displays and is adaptable for high pixel densities is desirable.

Additionally, as people become increasingly reliant on their smart phones and tablets, they tend to depend on their devices for keeping current on social network updates, calendar events, text messages, email messages, and voice mail messages, for example. It would be desirable to have the devices function so that a person could glance at the screen of their device without having to actuate the display screen and be able to see notifications. However running a light emissive display such as an LCD or AMOLED constantly would drain the battery quickly.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the embodiments.

Figure 1:
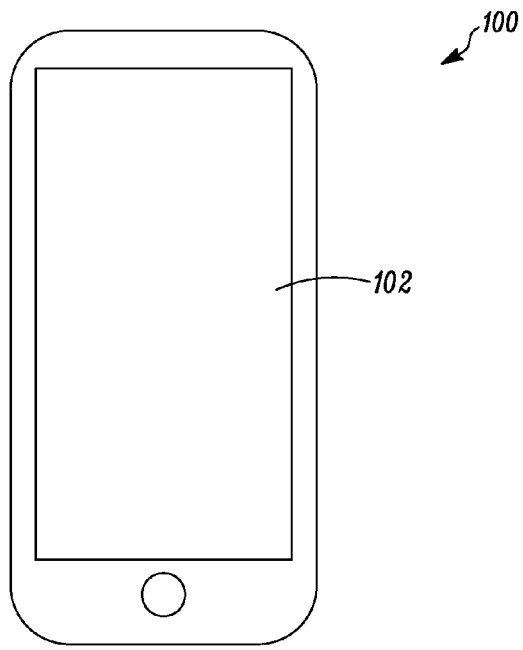
FIG. 1 is a front view of device that incorporates a display built according to an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments described herein.

DETAILED DESCRIPTION

Before describing embodiments in detail, it should be observed that the embodiments reside primarily in combinations of method steps and apparatus components related to display technology. Accordingly, the apparatus components and method steps have been represented where appropriate by conventional symbols in the drawings, showing only those specific details that are pertinent to understanding the so as not to obscure the disclosure with details that will be readily apparent to those of ordinary skill in the art having the benefit of the description herein.

FIG. 1 is a front view of device 100 that incorporates an electronic display 102 built according to an embodiment. The device 100 can be, for example, a smartphone, a hand-held electronic game, or a tablet computer. This device is portable which means that it is powered by a limited source of energy and may be used in a variety of ambient light conditions. For example, this device 100 may be used indoors or outdoors under ambient lighting conditions that range from very dark to vary bright.

Figure 2:
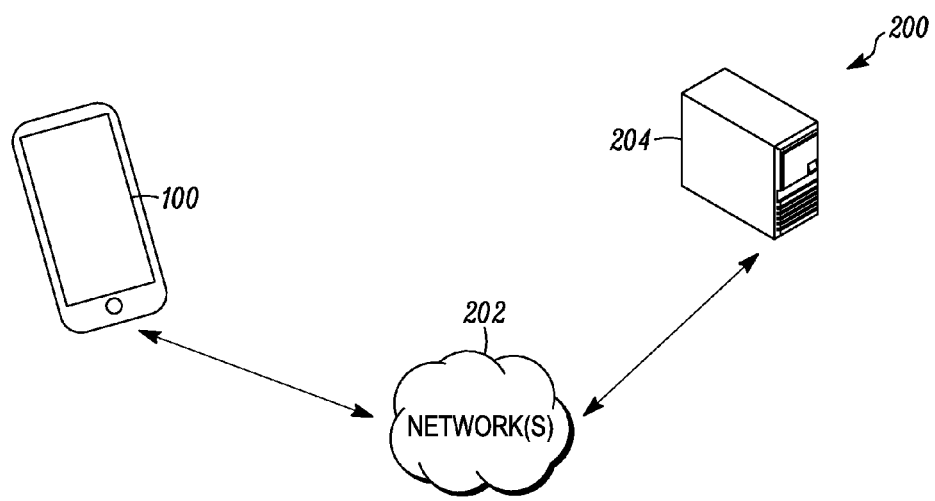
FIG. 2 is a schematic of a system in which the device shown in FIG. 1 is used according to an embodiment.

FIG. 2 is a schematic of a system 200 in which the device 100 shown in FIG. 1 is used according to an embodiment. The system 200 includes one or more interconnected networks 202 such as for example, the Internet, one or more Wi-Fi networks and/or one or more cellular telephony networks. The device 100 can communicatively couple to the one or more interconnected networks 202, for example by a Wi-Fi communication link or by via a cellular telephony link. A server computer 204 is also connected to the one or more interconnected networks 202 and hence can be communicatively coupled to the device 100 through the one or more interconnected networks 202. Content to be displayed on the display 102 of the device 100 may be received from the server computer 204 via the one or more interconnected networks 202. Supported by network connectivity, the device 100 may display a variety of data such as webpages, electronic books, videos, icons, menus, and messages in a variety of formats including: full-color video and graphics; color, black-and-white, and sepia photographs; black (or another color) text on a light background; white (or another color) text on a dark background; and others.

Figure 3:
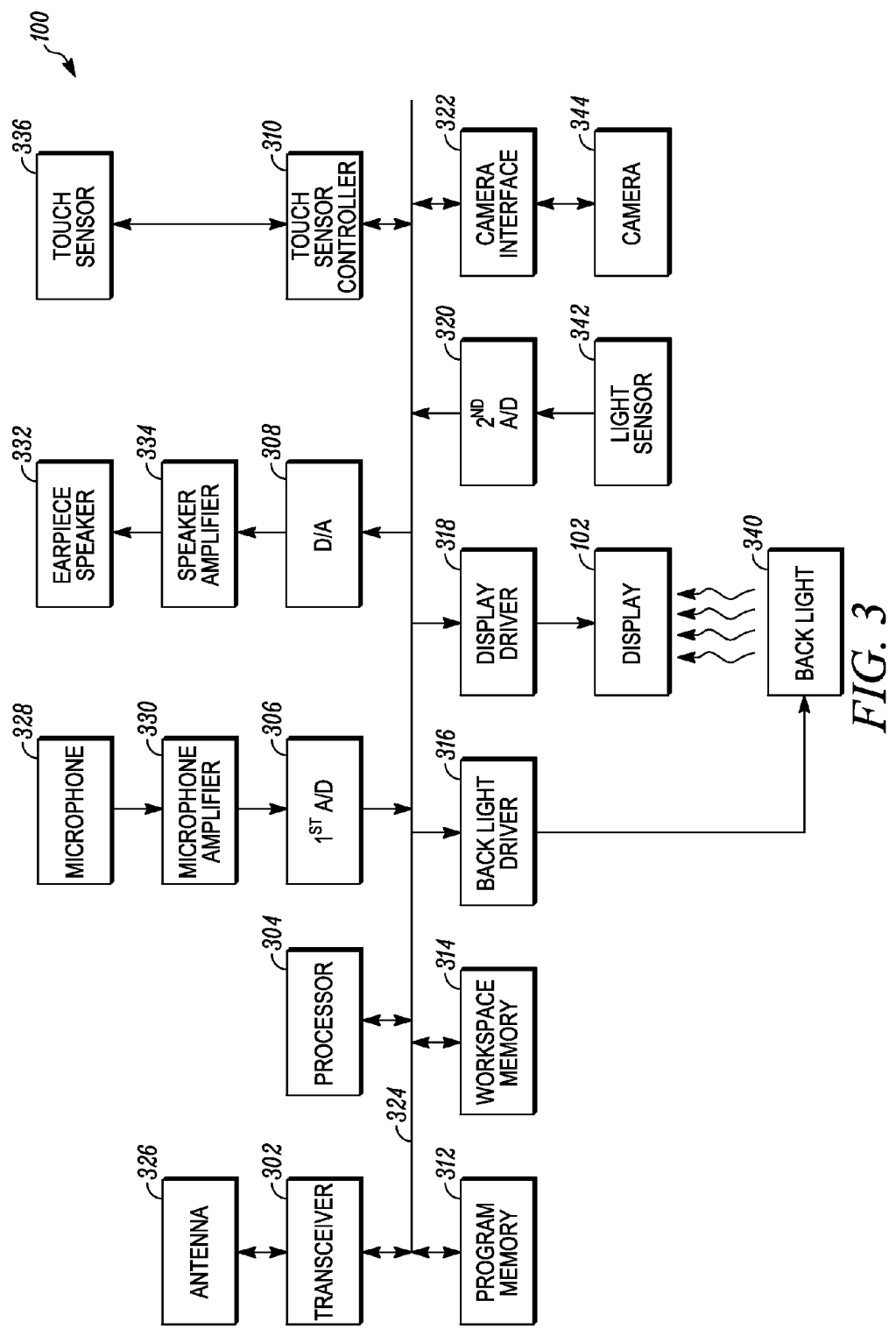
FIG. 3 is a block diagram of the device shown in FIG. 1 according to an embodiment.

FIG. 3 is a block diagram of the device 100 shown in FIG. 1 according to an embodiment. As shown in FIG. 3 the device 100 includes a transceiver 302, a processor 304, a first analog-to-digital converter (A/D) 306, a digital-to-analog converter (D/A) 308, a touch sensor 310, a program memory 312, a workspace memory 314, a back light driver 316, a display driver 318, a second A/D 320, and a camera interface 322 all coupled to a system bus 324. The transceiver 302 is coupled to an antenna 326 so that the device 100 can transmit and receive information wirelessly.

The processor 304 controls the overall operation of the device 100. The processor 304 uses the workspace memory 314 to execute programs stored in the program memory 312. The first A/D 306 is coupled to a microphone 328 via a microphone amplifier 330, so that voice and other sounds can be input into the device 100. The D/A 308 is coupled to an earpiece speaker 332 via a speaker amplifier 334, so that voice audio and other sounds can be output from the device 100. A touch sensor 336 is coupled to the touch sensor controller 310. The touch sensor 336 is positioned over the display 102 which is coupled to the display driver 318. Although this device 100 contemplates a touchscreen display 102, the display may be implemented without a touch sensor.

The back light driver 316 is coupled to a back light 340 which is optically coupled to the display 102. As described more fully below with reference to the flowchart shown in FIG. 16, the back light 340 is selectively driven according to logic that takes into account a prevailing ambient light level and an assessment of user interaction with the device 100, or selection of a particular mode by the user. A light sensor 342 is coupled to the second A/D 320. A camera 344 is coupled to the camera interface 322. Images or video clips captured by the camera 344 can be displayed on the display 102.

Figure 4:
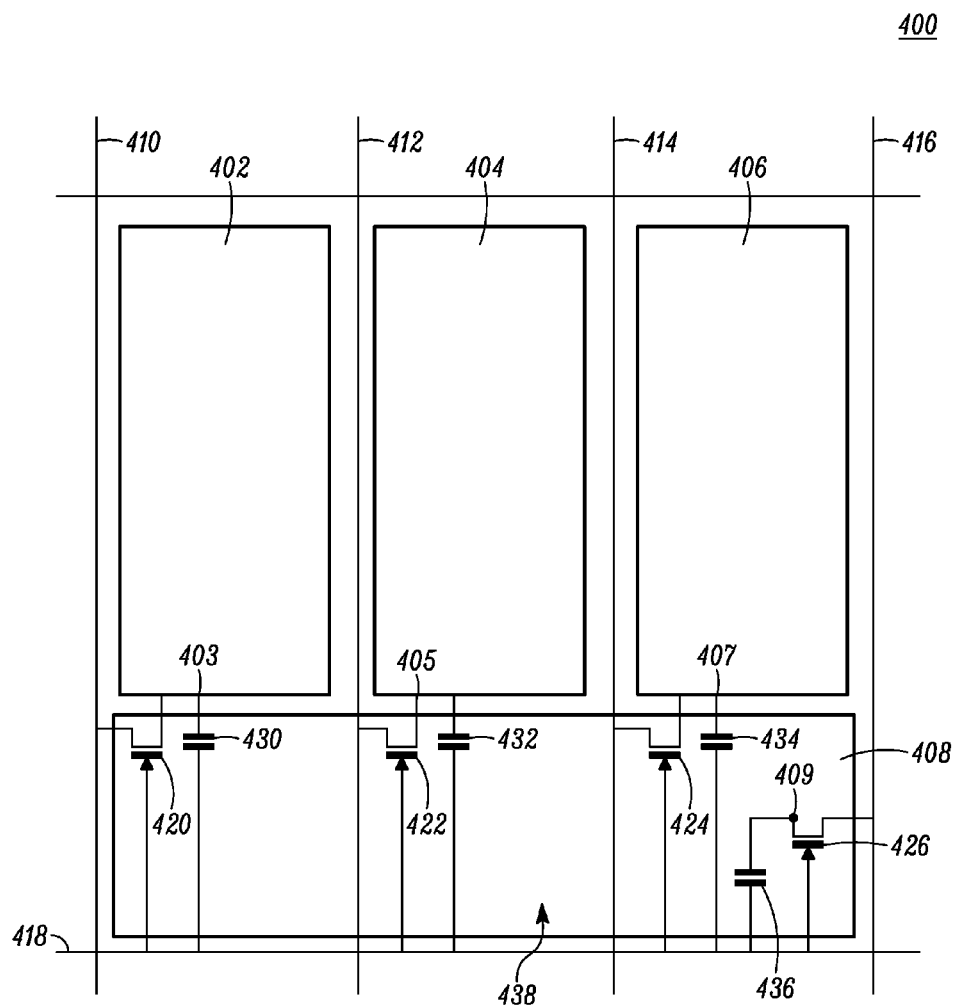
FIG. 4 is a top (plan) view of a pixel that can be implemented in a display that may be used in the device shown in FIG. 1 and which includes different subpixels that modulate light in different ways according to a first pixel embodiment.

FIG. 4 is a top (plan) view of a pixel 400 that can be implemented in the display 102 of the device 100 shown in FIG. 1 and which includes different subpixels that modulate light in different manners according to a first pixel embodiment. Referring to FIG. 4, the pixel 400 includes a first subpixel 402, a second subpixel 404, a third subpixel 406, and a fourth subpixel 408. The first 402, second 404, and third 406 subpixels are transmissive light modulators that, based on a liquid crystal state, independently transmit and modulate (or block) the intensity of light that emanates from the back light 340. Thus light can pass from the back light 340 through the first 402, second 404, and third 406 subpixels to a viewer.

Each of the first 402, second 404, and third 406 subpixels includes a different transmissive color filter, for example, respectively, color filters that transmit red, green, and blue light. Each of the color filters has different spectral bandpass. Alternatively different color filters can be used, for example, cyan, magenta, and yellow. Alternatively more than three transmissive light modulator subpixels, each with a different color filter, can be provided.

As shown, the fourth subpixel 408 is a reflective light modulator. The fourth subpixel optionally also includes a color filter. The spectral bandpass of the fourth subpixel is typically broader than that of the transmissive subpixels 402, 404, 406, and may for example reflect light that is white or slightly tinted. In certain embodiments a color filter for the reflective subpixel is used to correct the reflective subpixel to white. In certain embodiments the color of the reflective subpixel is a white color having a color temperature between 3200K and 8000K and a abs(Duv)<0.05 when illuminated with a D65 light source. When liquid crystal material is aligned, the fourth subpixel reflects ambient light incident on the fourth subpixel 408 while modulating its intensity. When the liquid crystal material is not aligned to "on state", it prevents much of the ambient light from reaching the reflective material in the fourth subpixel 408 or effects or fails to effect the polarization of light so as to prevent the reflected light from passing through a polarizer (not shown) located at the front (top) of the pixel 400.

The first 402, second 404, third 406, and fourth 408 subpixels are served by, respectively, a first column data line 410, a second column data line 412, a third column data line 414, and a fourth column data line 416 and all four of the subpixels 402, 404, 406, 408 are served by a row select line 418. The first 402, second 404, third 406, and fourth 408 subpixels respectively include a first subpixel input 403, a second subpixel input 405, a third subpixel input 407, and a fourth subpixel input 409 which are respectively coupled to drains of a first thin film transistor (TFT) 420, a second TFT 422, a third TFT 424, and a fourth TFT 426. Alternatively, TFD (thin film diode) or other types of circuits can perform the function similar to TFT.

Gates of the first TFT 420, second TFT 422, third TFT 424, and fourth TFT 426 are coupled to the row select line 418. A first storage capacitor 430, a second storage capacitor 432, a third storage capacitor 434, and a fourth storage capacitor 436 each include a first terminal coupled to the row select line 418 and a second terminal coupled respectively to the first 402, second 404, third 406, and fourth 408 subpixels. The storage capacitors 430, 432, 434, 436 serve to maintain (subject to some charge leakage between write display scan cycles) a voltage level applied through the column data lines 410, 412, 414, 416 when the TFTs 420, 422, 424, 426 are turned on. The fourth reflective subpixel 408 includes a mirror 438 which serves to reflect ambient light. The TFTs 420, 422, 424, 426 and the storage capacitors 430, 432, 434, 436 are located under the mirror 438.

This arrangement avoids the need to use the aperture area of the transmissive first, second, and, third subpixels 402, 404, 406, which might otherwise be used for back light transmission and modulation, to accommodate circuit elements. Thus the display brightness and contrast can be improved. Furthermore because each subpixel is either only a transmissive light modulator or a reflective light modulator drive signals used to drive each of the two types of subpixels can be individually optimized. This is in contrast to transflective subpixels where the same control voltage drives both the reflective light modulator part and the transmissive light modulator part. Specifically the voltage for each pixel brightness value can be chosen so that each type of subpixel (reflective or transmissive) responds with accurate fidelity to a given desired input output response for example linearly or according to a predetermined gamma value. This is important because in a typical transflective subpixel the transmissive and reflective light modulator portions do not exhibit identical brightness as a function of voltage.

Figure 5:
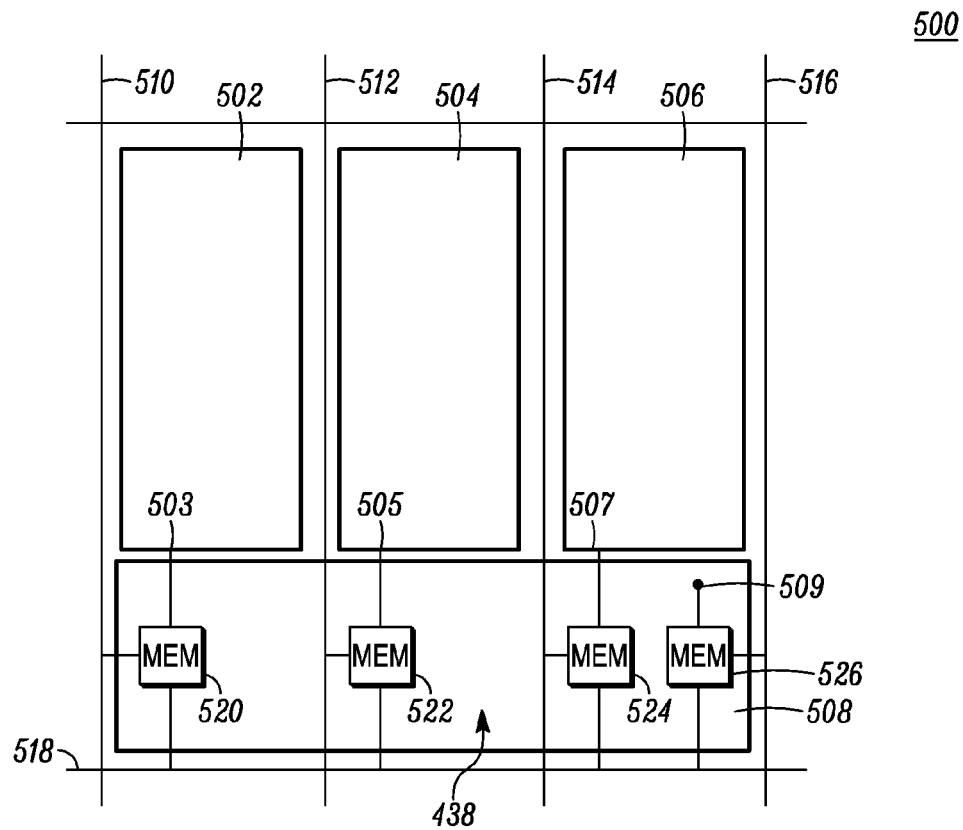
FIG. 5 is a top (plan) view of a pixel that can be implemented in a display that may be used in the device shown in FIG. 1 and which includes different subpixels that modulate light independently according to a second pixel embodiment that includes in-pixel memory.

FIG. 5 is a top (plan) view of a pixel 500 that can be implemented in the display 102 of the device 100 shown in FIG. 1 and which includes different subpixels that modulate light in different ways according to a second pixel embodiment that includes in-pixel memory. The embodiment shown in FIG. 5 differs from that shown in FIG. 4 in that in lieu of the TFTs 420, 422, 424, 426 and the storage capacitors 430, 432, 434, 436, an analogous set of subpixels 502, 504, 506, 508 are driven by one of four memory cells 520, 522, 524, 526. A first subpixel 502, a second subpixel 504, a third subpixel 506, and a fourth subpixel 508 respectively include a first subpixel input 503, a second subpixel input 505, a third subpixel input 507, and a fourth subpixel input 509. The first subpixel input 503, the second input subpixel 505, the third subpixel input 507, and the fourth subpixel input 509 are coupled to, and driven by, respectively a first memory cell 520, a second memory cell 522, a third memory cell 524, and a fourth memory cell 526, which are one form of circuit, in addition to the transistor and capacitor circuit shown in FIG. 4, that may be provided for driving subpixels.

A first column data line 510, a second column data line 512, a third column data line 514, and a fourth column data line 516 are, respectively drivingly coupled to the first memory cell 520, the second memory cell 522, the third memory cell 524, and the fourth memory cell 526. A row select line 518 is also drivingly coupled to the memory cells 520, 522, 524, 526. A write enable signal can be applied to the memory cells 520, 522, 524, 526 through the row select line 518 and binary data for controlling subpixel brightness can be input to the memory cells 520, 522, 524, 526 through the column data lines 510, 512, 514, 516. Optionally more than one column data line can be provided for each subpixel in order to transmit multi-bit brightness data to the memory cells 520, 522, 524, 526. Alternatively multi-bit brightness data can be sent sequentially or at once in encoded form over each column data line. There can be 1 to 4 memory cells for subpixels 502, 504, 506 and 508.

Figure 6:
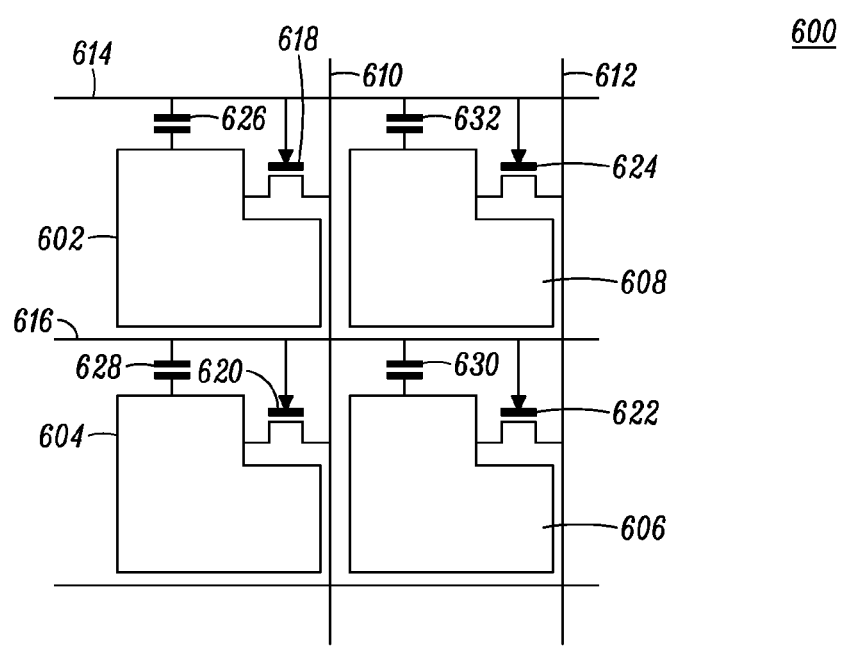
FIG. 6 is a top (plan) view of a pixel that can be implemented in a display that may be used in the device shown in FIG. 1 and which includes different subpixels that modulate light in different ways according to a third pixel embodiment.

FIG. 6 is a top (plan) view of a pixel 600 that can be implemented in the display 102 of the device 100 shown in FIG. 1 and which includes different subpixels 602, 604, 606, 608 that modulate light in different manners according to a third pixel embodiment. The pixel includes a first subpixel 602, a second subpixel 604, a third subpixel 606, and a fourth subpixel 608 arranged in a square arrangement with two rows and two columns of subpixels. The first subpixel 602, the second subpixel 604, and the third subpixel 606 are transmissive light modulators while the fourth subpixel 608 is a reflective light modulator. The first subpixel, the second subpixel, and the third subpixel include color filters for example, respectively, red, blue, and green color filters, or alternatively different colors. The fourth subpixel 608 includes a reflective mirror layer and optionally also includes a color filter.

Each subpixel 602, 604, 606, 608 has a light modulating area in the shape of a square with a smaller square area removed from one corner. A first column data line 610 serves the first subpixel 602 and the second subpixel 604 which are arranged in a first column on the left side of the pixel 600; and a second column data line 612 serves the third subpixel 606 and the fourth subpixel 608 which are arranged in a second column on the right side of the pixel 600. A first row select line 614 serves the first subpixel 602 and the fourth subpixel 608 which are arranged in a first row at the top of the pixel 600; and a second row select line 616 serves the second subpixel 604 and the third subpixel 606 which are arranged in a second row at the bottom of the pixel 600. The first 602, second 604, third 606, and fourth 608 subpixels include respectively a first TFT 618, a second TFT 620, a third TFT 622, and a fourth TFT 624 and respectively include a first storage capacitor 626, a second storage capacitor 628, a third storage capacitor 630, and a fourth storage capacitor 632. The drain of each TFT 618, 620, 622, 624 and a first terminal of each storage capacitor 626, 628, 630, 632 are connected to a drive electrode for each subpixel. The source of the TFT 618, 620, 622, 624 for each particular subpixel 602, 604, 606, 608 is coupled to column data line (610 or 612) that serves the particular subpixel 602, 604, 606, 608. The gate of the TFT 618, 620, 622, 624 for each particular subpixel 602, 604, 606, 608 and a second terminal of each storage capacitor 626, 628, 630, 632 are coupled to the row select line (614 or 616) that serves the particular subpixel.

The TFTs 618, 620, 622, 624 are located in aforementioned smaller square area that is not part of the light transmitting area of each subpixel 602, 604, 606, 608. Of course, the circuitry area does not have to be square, nor does each subpixel of the array need to be the same general shape and size, but this simplified schematic demonstrates how liquid crystal display circuitry can reduce the light modulating area of each subpixel for both the transmissive and reflective subpixels. Given that the reflective subpixel 608 does not transmit back light to a viewer, there is an opportunity to increase the usable area of the transmissive subpixels 602, 604, 606 by moving the circuitry under the reflector of the reflective subpixel 608 as will be shown in FIG. 7. According to other embodiments of the invention, as shown in FIGS. 4, 5, 7-10, more aperture area in the transmissive subpixels is obtained by locating circuitry for driving the transmissive subpixels under a reflective layer of the reflective subpixel.

Figure 7:
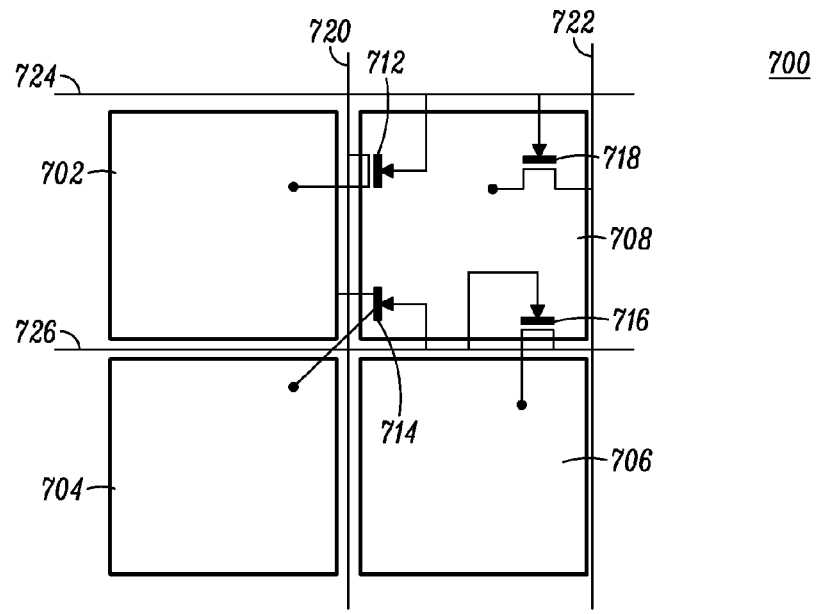
FIG. 7 is a top (plan) view of a pixel that can be implemented in a display that may be used in the device shown in FIG. 1 and which includes different subpixels that modulate light in separate manners according to a fourth pixel embodiment.

FIG. 7 is a top (plan) view of a pixel 700 that can be implemented in the display 102 and which includes a plurality of subpixels that modulate light independently according to a fourth pixel embodiment. The pixel 700 includes a first subpixel 702, a second subpixel 704, a third subpixel 706, and a fourth subpixel 708 arranged in a square array with two rows and two columns of subpixels. The first 702, second 704, and third 706 subpixels are transmissive light modulators and the fourth subpixel 708 is a reflective light modulator. The first 702, second 704, and third subpixels 706 include color filters and the fourth subpixel 708 may also include a color filter. The fourth subpixel 708 includes a reflector (e.g., a mirror) 710 to reflect ambient light. The reflector can be flat or with a bumpy structure to reflect more light towards the viewer.

A first TFT 712, a second TFT 714, a third TFT 716, and a fourth TFT 718 are respectively drivingly coupled to the first subpixel 702, the second subpixel 704, the third subpixel 706, and the fourth subpixel 708. The TFTs 712, 714, 716, 718 are located under the mirror 710. The pixel 700 is shown in x-ray view so that the TFTs 712, 714, 716, 718 may be seen although they are located under the mirror 710. Drains of the first TFT 712, the second TFT 714, the third TFT 716, and the fourth TFT 718 are respectively coupled to the first subpixel 702, the second subpixel 704, the third subpixel 706, and the fourth subpixel 708. Sources of the first TFT 712 and second TFT 714 are coupled to a first column data line 720 while drains of the third TFT 716 and fourth TFT 718 are coupled to a second column data line 722. Gates of the first TFT 712 and fourth TFT 718 are coupled to a first row select line 724 while gates of the second TFT 714 and third TFT 716 are coupled to a second row select line 726. Storage capacitors (not shown) may also be provided as described with respect to FIG. 6. Alternatively in-pixel memory cells may be used in lieu of the TFTs 712, 714, 716, 718 and located under the mirror 710 as described with respect to FIG. 5.

When pixel densities increase, subpixel areas decrease; but circuitry size is not decreasing as quickly as the subpixel size. Thus, placing the circuitry of multiple subpixels under a single reflective subpixel 708 may result in a reflective subpixel 708 larger than its counterpart transmissive subpixels 702, 704, 706. This can be accommodated as shown in FIG. 8 with differing subpixel sizes and patterns.

Figure 8:
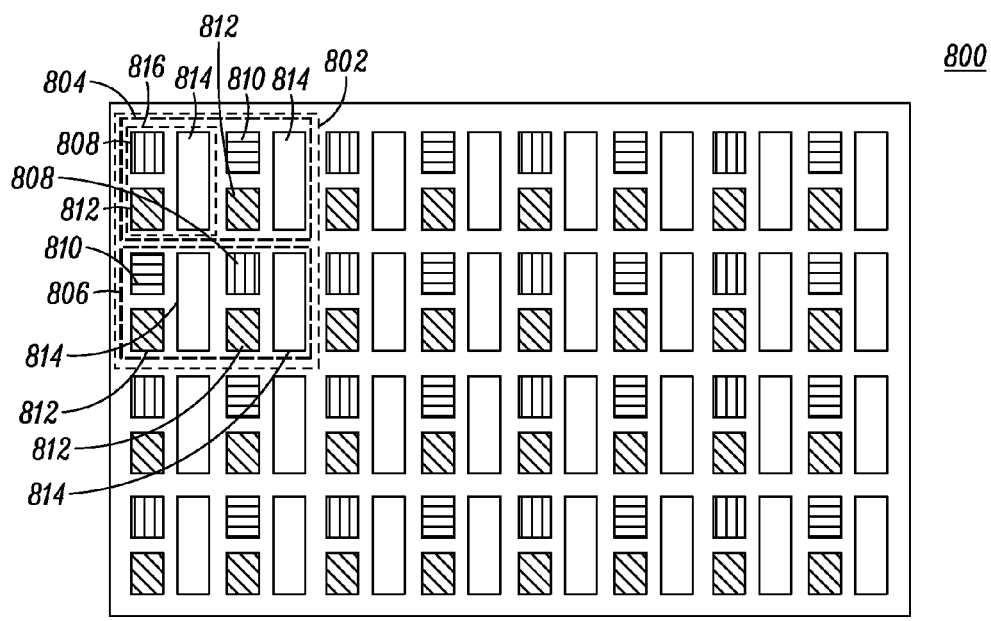
FIG. 8 is a plan view of a display that may be used in the device shown in FIG. 1 showing a layout of pixels of the display.

FIG. 8 is a plan view of a display 800 that can be used as the display 102 of the device shown in FIG. 1 according to an embodiment. FIG. 8 shows a layout of pixels of the display 800. So as not to crowd the drawing, a limited number of pixels are shown and a limited number of those are labeled with reference numerals. In an actual display the number of pixels will be higher, e.g., more than one hundred thousand in number. The arrangement of subpixels in the display 800 is 2-D periodic. A dashed outline box 802 identifies a basic repeating unit 802 of the 2-D periodic arrangement. The basic repeating unit 802 includes an upper pixel 804 and a lower pixel 806 which differ by transposition of red subpixels 808 (vertical hatch) and blue subpixels 810 (horizontal hatch). Both the upper pixel 804 and lower pixel 806 include two green subpixels 812 (diagonal hatch) in comparison to one each of the red subpixels 808 and the blue subpixels 810. The colored subpixels 808, 810, 812 are arranged in columns two subpixels high within each pixel 804, 806. Each of the upper pixel 804 and lower pixel 806 includes two reflective (mirror) subpixels 814. Each reflective subpixel 814 spans the height of a column of two colored subpixels. The reflective subpixels 814 alternate in position horizontally with columns of color subpixels 808, 810, 812. The left half 816 of the upper pixel 804 of the upper pixel 804 is demarcated by a dashed outline in FIG. 9 and shown in more detail in FIG. 9.

Figure 9:
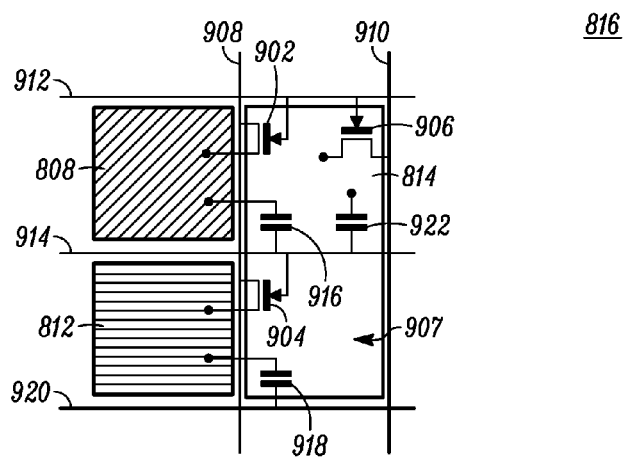
FIG. 9 is a top (plan) view of one-half of a pixel of a display shown in FIG. 8 which includes different subpixels that modulate light in different manners according to a fifth pixel embodiment.

Referring to FIG. 9 the left half 816 of the upper pixel 804 includes on the left side a column of subpixels including one of the red subpixels 808 positioned above one of the green subpixels 812 and on the right side one of the reflective subpixels 814. The drain of a first TFT 902 is coupled to the red subpixel 808, the drain of a second TFT 904 is coupled to the green subpixel 812, and the drain of a third TFT 906 is coupled to the reflective subpixel 814. FIG. 9 is a partial x-ray view, so that the TFTs 902, 904, 906 can be seen although they located below an opaque reflector (mirror) 907 of the reflective subpixel 814. A first column data line 908 is coupled to the source of the first TFT 902 and to the source of the second TFT 904. A second column data line 910 is coupled to the source of the third TFT 906. A first row select line 912 is coupled to the gate of the first TFT 902 and to the gate of the third TFT 906. Similarly a second row select line 914 is coupled to the gate of the second TFT 904. A first storage capacitor 916 has one terminal coupled to the red subpixel 808 and a second terminal coupled to the second row select line 914; a second storage capacitor 918 has one terminal coupled to the green subpixel 812 and a second terminal coupled to the third row select line 920; and a third storage capacitor 922 has one terminal coupled to the mirror subpixel 814 and a second terminal coupled to the second row select line 914.

In the configuration of FIG. 9, circuitry for three subpixels 808, 812, 814 is hidden under the reflector 907 of the reflective subpixel 814. This supports high pixel density for the color subpixels 808, 810, 812, full usage of the color subpixels 808, 810, 812 for back light transmission with very little blockage by circuitry, and high pixel density for the reflective subpixels 814, while avoiding step-changes in liquid crystal depth common in transflective subpixels.

Figure 10:
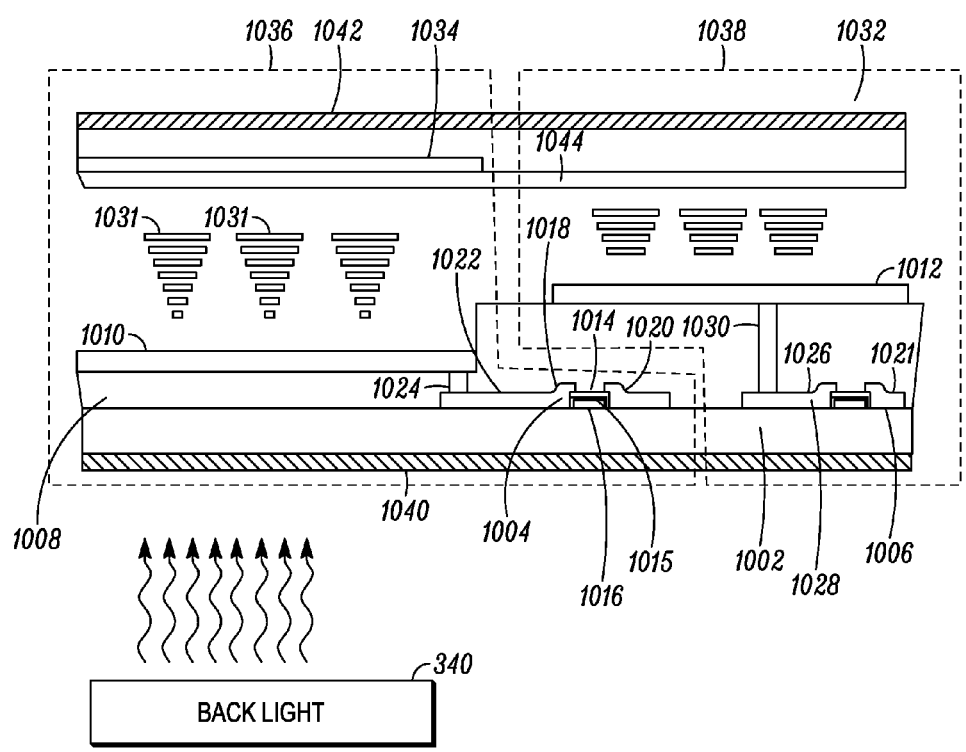
FIG. 10 is a sectional elevation view of a portion of a display that may be used as the display in the device shown in FIG. 1 according to an embodiment.

FIG. 10 is a sectional elevation view of a portion of a display 1000 that may be used as the display 102 in the device shown in FIG. 1 according to an embodiment. FIG. 10 shows how circuitry tucked beneath a subpixel 408, 508, 708, 814 that forms a reflective light modulator can significantly reduce blockage of back light in subpixels 402, 404,

406, 502, 504, 506, 702, 704, 706, 808, 810, 812 that form transmissive light modulators. The display 1000 includes a bottom transparent substrate 1002 on which are formed a first TFT 1004 and a second TFT 1006. A spacer layer 1008 is formed over the first TFT 1004 and the second TFT 1006. A transparent electrode 1010 is positioned on top of the spacer layer 1008 on the left side of the portion of the display 1000 shown in FIG. 10 and reflector 1012 is positioned on top of the spacer layer 1008 on the right side of the portion of the display 1000 shown in FIG. 10. The reflector 1012 can be made from a dielectric (non-metal) or conductive (e.g., metal) material. One example of a dielectric mirror that may be used is a multi-layer interference mirror (Bragg mirror).

The dashed outline box 1036 identifies a transmissive light modulator subpixel that transmits and modulates the intensity of light from the back light 340. The dashed outline box 1038 identifies a reflective light modulator subpixel that reflects ambient light while modulating the intensity. Although the back light 340 shown in FIG. 10 does not extend below the reflective electrode 1012, it may extend under the reflective electronic 1012 in certain embodiments with the understanding that the light emitted by the back light will not be transmitted through the reflective subpixel 1083. For example, in the embodiments shown in FIG. 6-7, construction of a continuous back light panel may be more straightforward than construction of a back light panel under only three quarters of the 2×2 array. In other embodiments, such as those shown in FIGS. 4-5 and 8-9, separate back light panels may be constructed and controlled either individually or as a block.

The first TFT 1004 and the second TFT 1006 are positioned under the reflector 1012. This positioning avoids having to reduce the light modulating area of the display 1000 in order to provide area specifically for the first TFT 1004 and the second TFT 1006. The first TFT 1004 includes a semiconductor 1014 in which a transistor channel is formed, a gate electrode 1016 (which may be coupled to a row select line, e.g., 418, 518, 614, 616, 724, 726, 912, 914) is positioned on the bottom transparent substrate 1002 under the center of the semiconductor 1014. An insulator 1015 is positioned between the gate electrode 1016 and the semiconductor 1014. A drain contact 1018 and a source contact 1020 (which may be coupled to a column data line, e.g., 410, 412, 414, 416, 510, 512, 514, 516, 610, 612, 720, 722, 908, 910) contact opposite sides of the semiconductor 1014.

A first trace 1022 extends from the drain contact 1018 to a distal end located under the transparent electrode 1010 and first via 1024 extends from the distal end through the spacer layer 1008 to the transparent electrode 1010. The second TFT 1006 has the same structure as the first TFT 1004 and has a second shorter trace 1026 extending from its drain electrode 1028 to a distal end under the reflective electrode 1012, and a second via 1030 extends from the distal end up to the reflective electrode 1012. The source 1020 of the first TFT 1004 and a source contact 1021 of the second TFT 1006 serve as inputs for inputting light modulation signals into, respectively the transmissive light modulator subpixel 1036 and the reflective light modulator subpixel 1038.

A top transparent substrate 1032 is positioned above and spaced from the bottom transparent substrate 1002. The perimeters of the bottom transparent substrate 1002 and the top transparent substrate 1032 (not visible in the view of FIG. 10) are sealed together. A liquid crystal material 1031 is held in a space created between the bottom transparent substrate 1002 and the top transparent substrate 1032. In certain embodiments a common or counter electrode (not shown) is formed on the top transparent substrate 1032 and in other, so called In Plane Switching (IPS), embodiments the common or counter electrode can be formed on the spacer layer 1008. In the latter case the transparent electrode 1010 and the reflective electrode 1012 can take the form of comb shapes that are interdigitated with the common electrode which also takes the form of a comb shape. A separate reflector (not shown) can also be used. Using these electrodes, a display driver can control the alignment of the liquid crystal material to pass or block light through individual subpixels. A color (e.g., red, blue, green, cyan, yellow or magenta) filter 1034 can be positioned on the top transparent substrate 1032 over the transparent electrode 1010. Optionally another color filter can be positioned over the reflective electrode 1012. Alternatively, a reflector that exhibits wavelength dependent reflectance can be used in the reflective light modulator subpixel 1038.

A first light polarizer 1040 is positioned on the bottom of the bottom transparent substrate 1002 and a second light polarizer 1042 (which may also be referred to as an analyzer) is positioned on the top of the top transparent substrate 1032. The relative orientation of the first light polarizer 1040 and the second 1042 is chosen in view of the electrically induced phase retardation due to the liquid crystal material. A liquid crystal alignment layer 1044 is positioned over the color filter 1034 on the inside surface of the top transparent substrate 1032 facing the liquid crystal material 1031.

Embodiments of the invention can take the form of Twisted Nematic (TN), Super Twisted Nematic (STN), Electrically Controlled Birefringence (ECB), Vertically Aligned (VA) or In-Plane Switching (IPS) liquid crystal displays. Regardless of the liquid crystal material, the subpixel structure allows a reflective subpixel to be independent of a transmissive subpixel and avoid the black masking common in transflective subpixels. Additionally, the reflective subpixel can support its own circuitry and also that of one or more surrounding transmissive subpixels. As higher pixel density displays develop, this opportunity to reduce circuitry blockage of back light takes on higher significance. Also, this subpixel architecture is very flexible and can support a variety of shapes and patterns as shown. Of course, other shapes (including some not as regular as the quadrilaterals shown) may be used depending on the particular implementation and the design targets.

The display 1002 is of a dual gap design in which the thickness of the liquid crystal material 1031 has one value in the transmissive light modulator subpixel 1036 and another value in the reflective light modulator subpixel 1038. As shown in FIG. 10, this is achieved by making the spacer layer 1008 variable in thickness. The purpose of the dual gap design is to substantially equalize the optical path length of light in the transmissive 1036 and reflective 1038 subpixels. Light traverses the portion of the liquid crystal material 1031 in the transmissive subpixel 1036 once but traverses the portion of the liquid crystal material 1031 in the reflective subpixel 1038 twice. However because of the different thicknesses of the liquid crystal material 1031 the optical path lengths in the respective subpixels 1036, 1038 is substantially equalized. However providing the variable thickness spacer layer 1008 is costly and complicates manufacturing. Furthermore, the abrupt step in the thickness of the spacer layer 1008 may create a distorted region of the liquid crystal material that is associated with reduced contrast.

Figure 11:
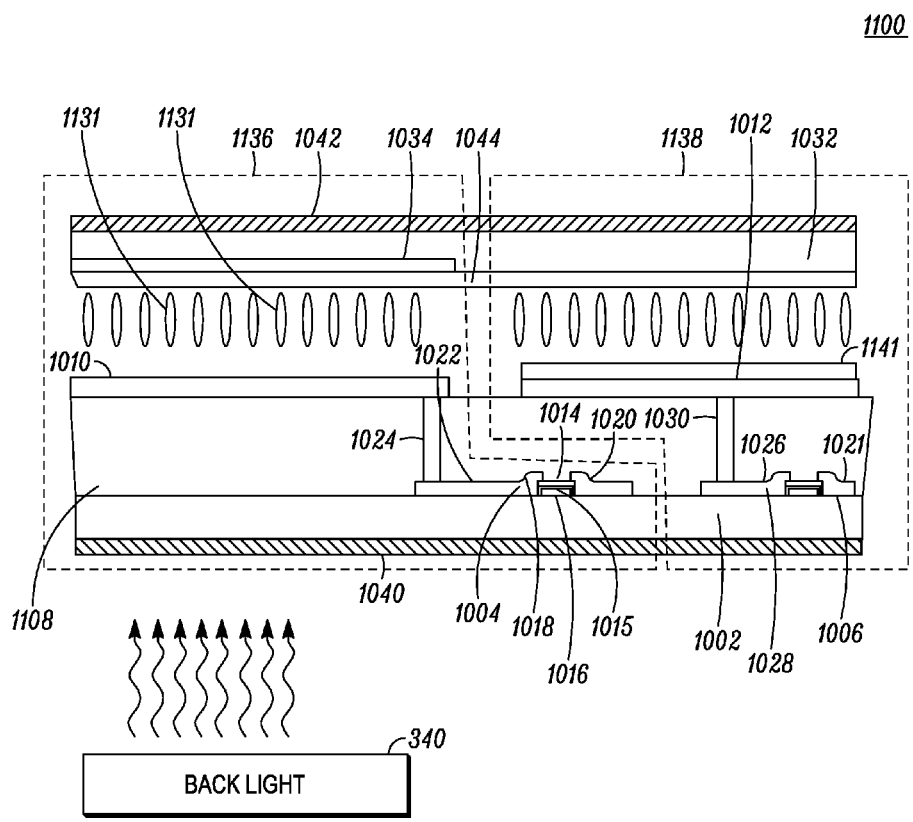
FIG. 11 is a sectional elevation view of a portion of a display that may be used as the display in the device shown in FIG. 1 according to an alternative embodiment.

FIG. 11 is a sectional elevation view of a portion of a display 1100 that may be used as the display 102 in the device shown in FIG. 1 according to an alternative embodiment. Compared to the embodiment shown in FIG. 10, the embodiment shown in FIG. 11 differs in certain respects. The display 1100 includes a spacer layer 1108 of substantially constant thickness in place of the variable thickness spacer layer 1008. The spacer layer 1108 is thus of lower cost and more easily and reliably made. A liquid crystal material 1131 is present in a vertically aligned configuration in the display 1100. A reflective light modulator subpixel 1138 of the display 1100 also includes a phase retarder (e.g., quarter wave plate) 1141 positioned above the reflective electrode 1012. The display 1100 may of the normally black type such that the brightness is at a minimum when zero voltages are applied to the drive electrodes 1010, 1012 and others (not shown).

The polarizers 1040, 1042 are crossed so that passage of light out of the display 1100 depends on electric field which reorients the liquid crystal material 1131 to an orientation in which the liquid crystal material 1131 presents differing ordinary and extraordinary indices of refraction to the propagating light and thus acts as an additional phase retarder which can rotate the light's polarization to varying degrees and allow light to escape the top polarizer 1044 to varying degrees.

Because the reflective light modulator subpixel 1138 and a transmissive light modulator subpixel 1136 of the display 1100 are controlled by separate inputs (e.g., source contacts 1020, 1021 of TFTs 1004, 1006 to which voltages may be applied), the voltages chosen to attain a certain light modulation level (e.g., a specified fraction of full brightness) may be chosen separately for the reflective light modulator subpixel 1138 and the transmissive light modulator subpixel 1136. Employing the spacer layer 1108 of substantially constant thickness has certain practical benefits mentioned above, however it means that the optical path length for reflected light will be substantially greater than that for transmitted light. However, in certain embodiments of the invention distinct voltage signals are used to drive the reflective light modulator subpixel 1138 and the transmissive light modulator subpixel 1136. The distinct voltage signals are chosen to equalize the variation of brightness as a function of binary pixel brightness value of the reflective light modulator subpixel 1138 and the transmissive light modulator subpixel 1136. Two approaches to generating the distinct voltage signals are described below with reference to FIG. 17 and FIG. 19.

Figure 12:
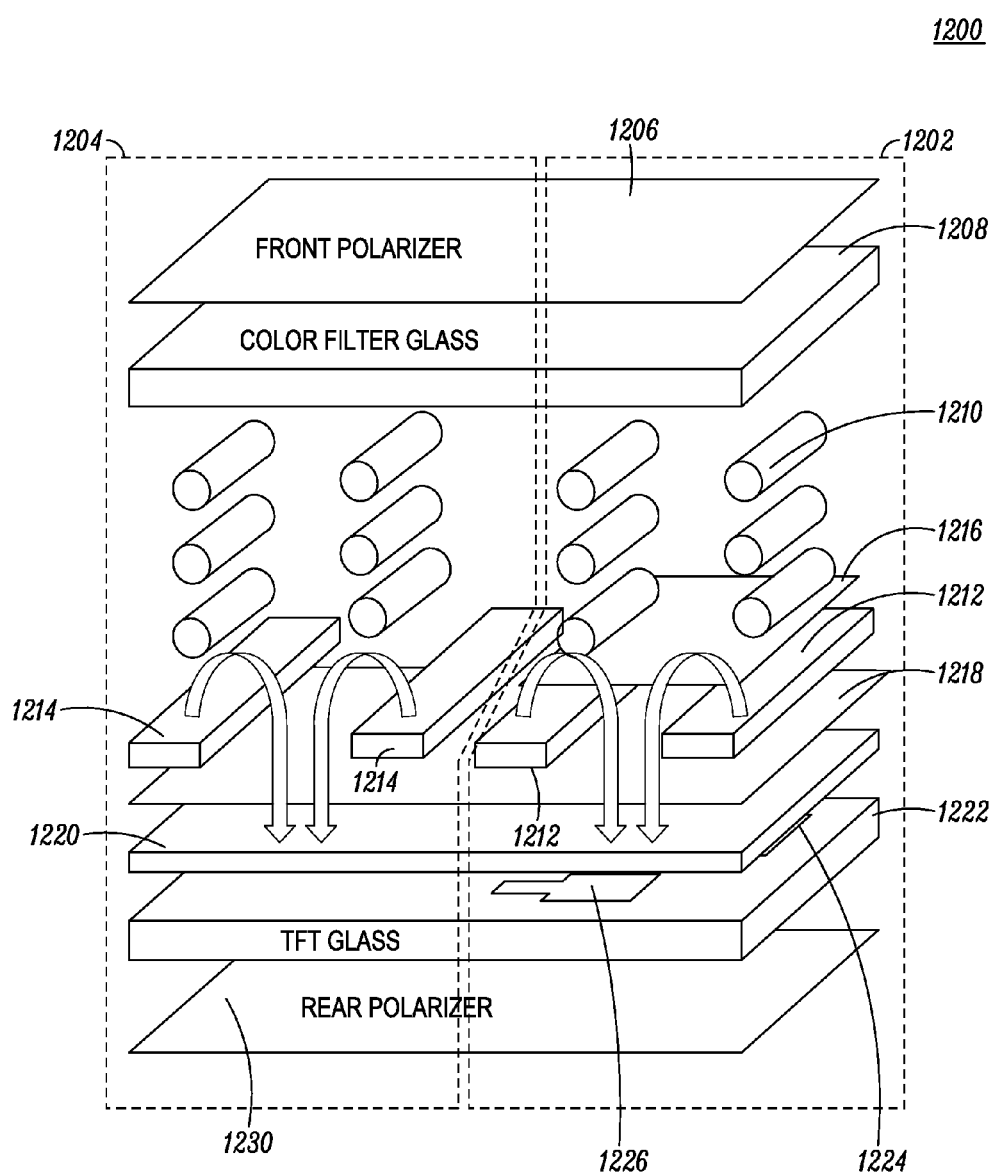
FIG. 12 is a schematic, exploded, oblique view of a portion of a display showing a reflective light modulator subpixel and a transmissive light modulator subpixel according to an additional embodiment.

FIG. 12 is a schematic, exploded, oblique view of a portion of a display 1200 showing a reflective light modulator subpixel 1202 and a transmissive light modulator subpixel 1204 according to an additional embodiment. Starting from the top of FIG. 12, the display 1200 includes a front polarizer 1206, a color filter glass 1208, a liquid crystal material 1210, a reflector 1216 in the reflective light modulator subpixel 1202, two sets of pixel electrodes 1212, 1214 including a first set of pixel electrodes 1212 for the reflective light modulator 1202 and a second set of pixel electrodes 1214 for the transmissive light modulator 1204, a passivation layer 1218, a common electrode 1220, a rear TFT glass 1222 on which are located two subpixel drive circuits 1224, 1226 including a first drive circuit 1224 for the reflective light modulator subpixel 1202 and a second drive circuit 1226 for the transmissive light modulator subpixel 1204.

The drive circuits 1224, 1226 are located under the reflector 1216, so as not to take up area that is use to transmit light through the transmissive light modulator subpixel 1204 and other transmissive light modulator subpixels (not shown). Traces and vias (not shown) connect the drive circuits 1224, 1226, to the pixel electrodes 1212, 1214. A rear polarizer 1230 is located below the rear TFT glass 1222.

The subpixels 1202, 1204 use a Fringe Field Switching (FFS) electrode configuration which includes the pixel electrodes 1212, 1214 and the common electrode 1220.

Figure 13:
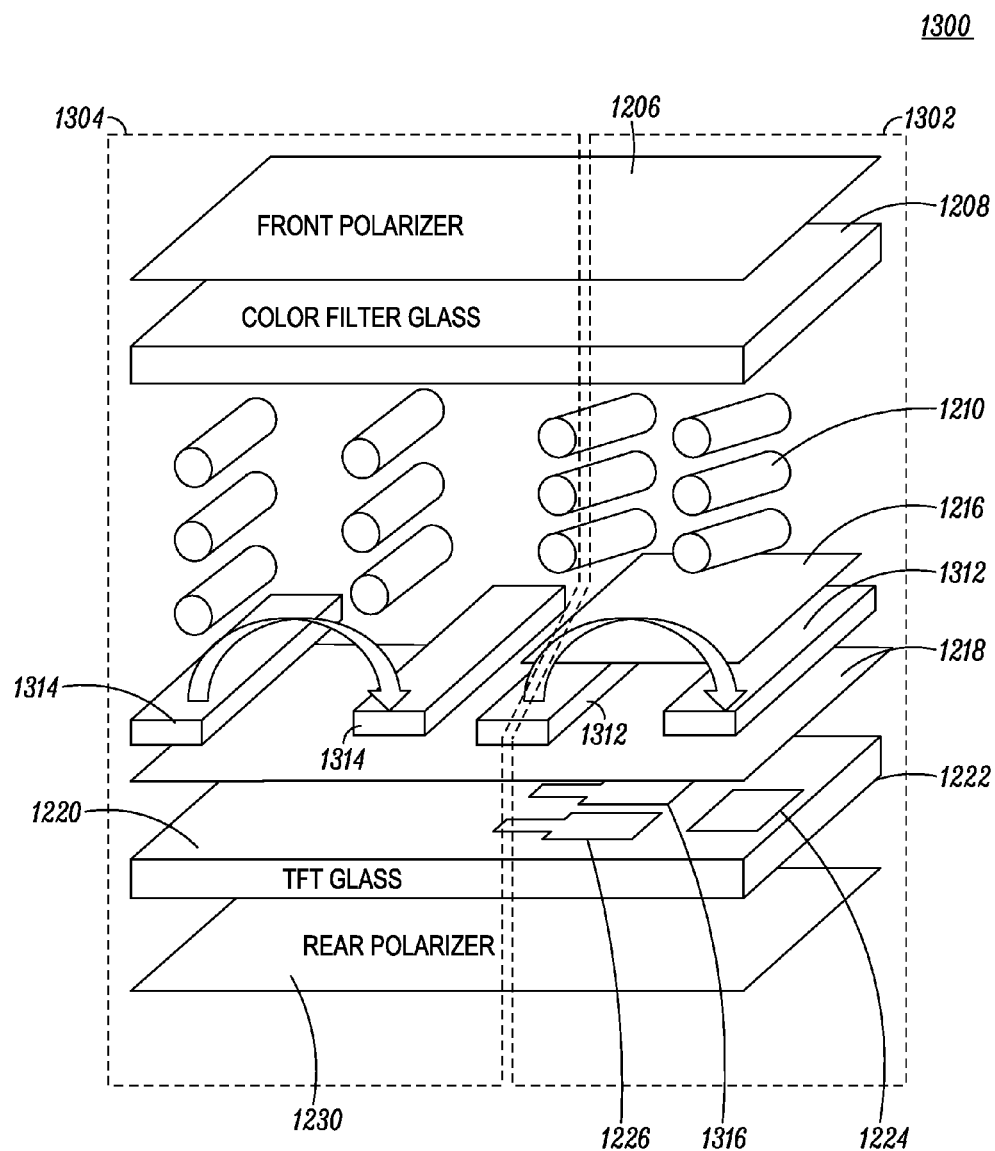
FIG. 13 is a schematic, exploded, oblique view of a portion of a display showing a reflective light modulator subpixel and a transmissive light modulator subpixel according to an another embodiment.

FIG. 13 is a schematic, exploded, oblique view of a portion of a display 1300 showing a reflective light modulator subpixel 1302 and a transmissive light modulator subpixel 1304 according to an another embodiment. The display 1300 has many parts in common with the display 1200 shown in FIG. 12 as indicated by the use of the same reference numerals. However the subpixels 1302, 1304 have different drive electrode configurations compared to FIG. 12. The display 1300 is an in-plane switching (IPS) display. The reflective light modulator subpixel 1302 includes a first set of interdigitated IPS electrodes 1312 (only two of which are shown). Similarly the transmissive light modulator subpixel 1304 includes another set of interdigitated IPS electrodes 1314. In practice, each set of electrodes 1312, 1314 comprises pairs of electrodes with each pair including a common electrode and a pixel electrode. An additional subpixel drive circuit 1316 for driving another subpixel (not shown) is visible under the reflector 1216

Figure 14:
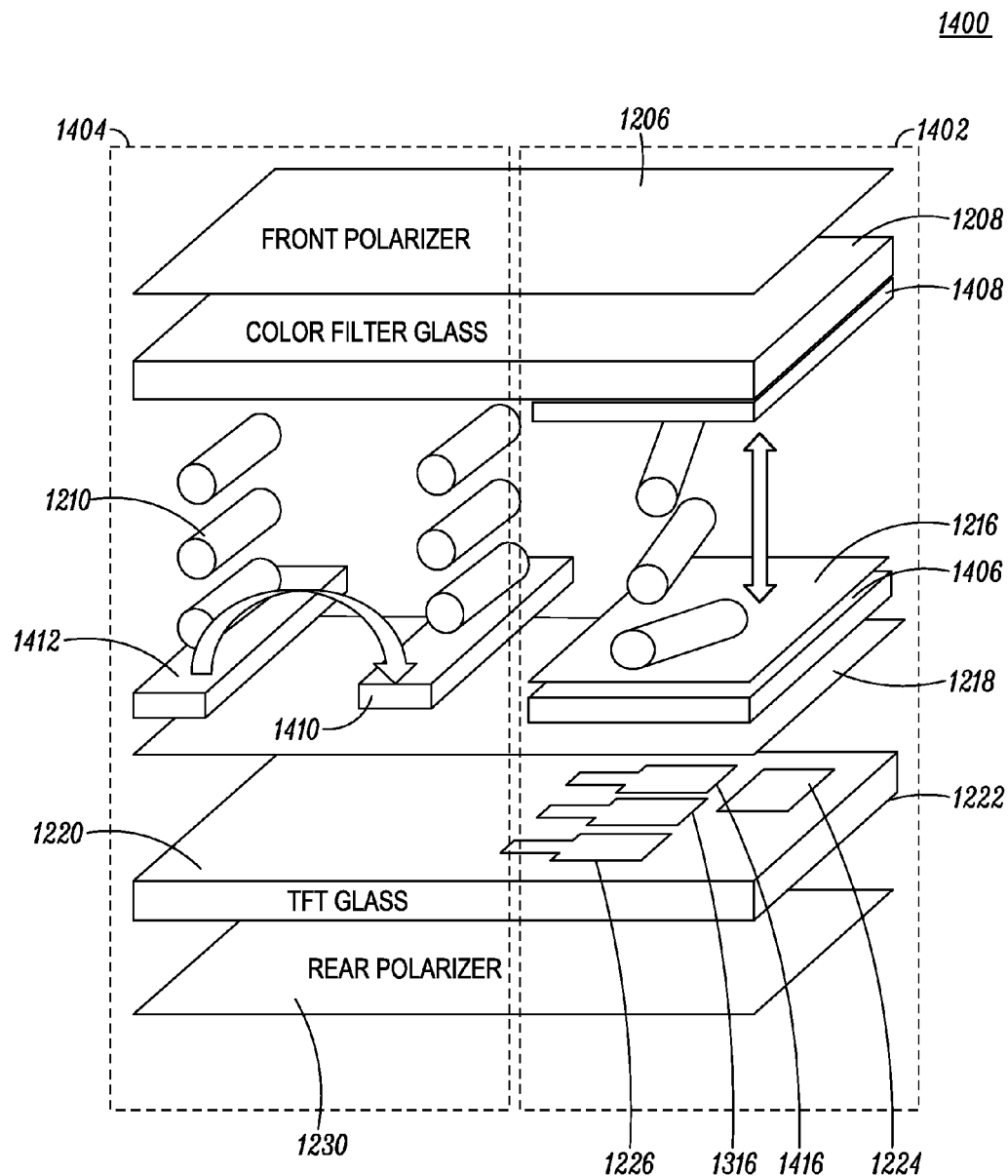
FIG. 14 is a schematic, exploded, oblique view of a portion of a display showing a reflective light modulator subpixel and a transmissive light modulator subpixel according to a further embodiment.

FIG. 14 is a schematic, exploded, oblique view of a portion of a display 1400 showing a reflective light modulator subpixel 1402 and a transmissive light modulator subpixel 1404 according to a further embodiment. The display 1400 has many parts in common with the display 1200 shown in FIG. 12 as indicated by the use of the same reference numerals. However the subpixels 1402, 1404 have different drive electrode configurations compared to FIG. 12. The reflective subpixel 1402 has a reflective pixel electrode 1406 located on the passivation layer 1218 and a common electrode 1408 located on the color filter glass 1208 across the liquid crystal material 1210 and facing the reflective pixel electrode 1406. The reflective subpixel 1402 can be configured as an Electrically Controlled Birrefringence (ECB), Vertical Alignment (VA), Twisted Nematic (TN), Super Twisted Nematic (STN) or type of LCD modulator that uses a field that crosses the liquid crystal material 1210 between the two substrates e.g., the color filter glass 1208, and the TFT glass 1222. The transmissive light modulator 1404 of the display 1400 includes IPS switching electrodes 1410, 1412 (schematically represented by two electrodes although in practice more than two may be provided). An additional subpixel drive circuit 1416 for driving another subpixel (not shown) is visible under the reflector 1216.

Figure 15:
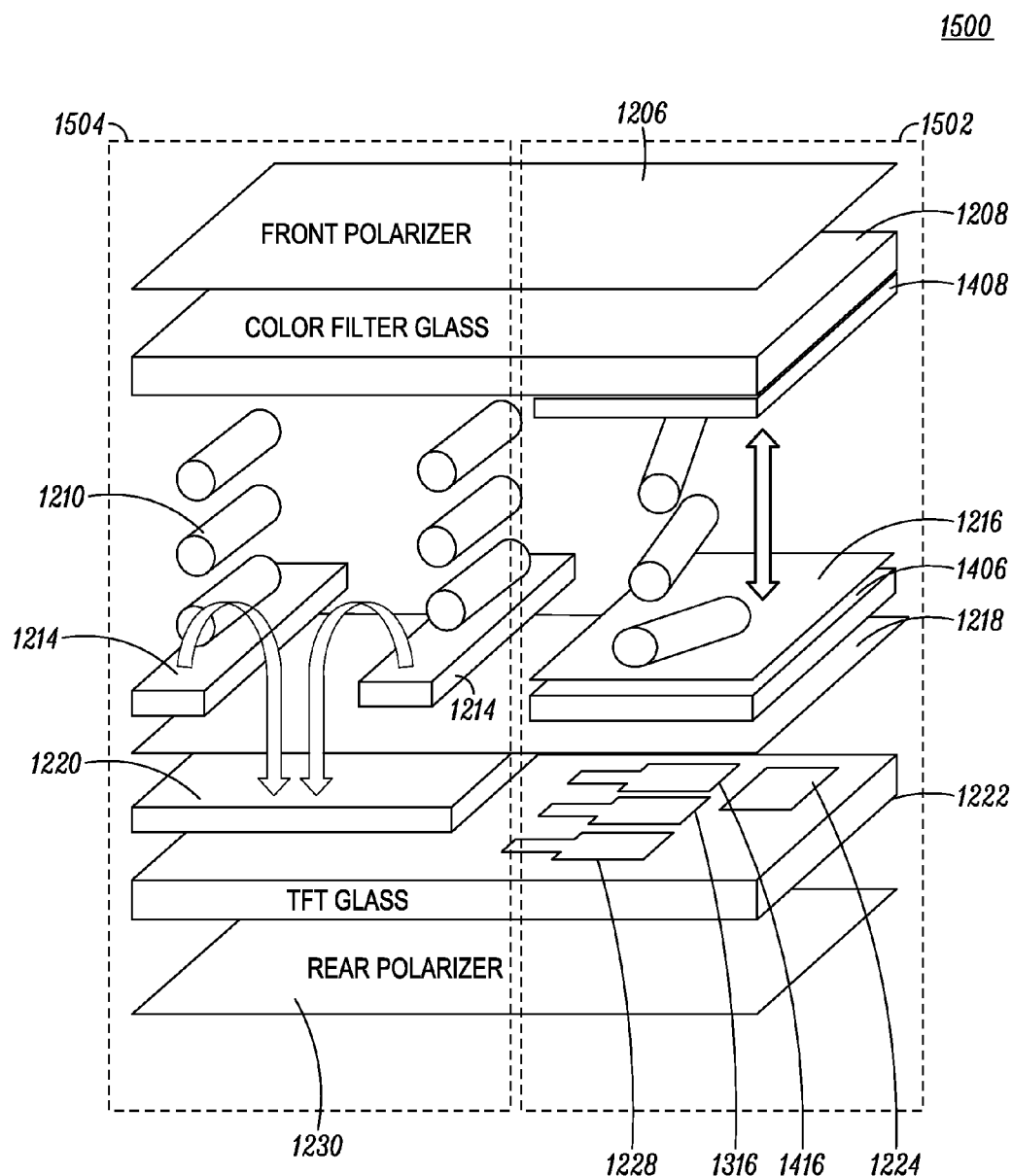
FIG. 15 is a schematic, exploded, oblique view of a portion of a display showing a reflective light modulator subpixel and a transmissive light modulator subpixel according to a still further embodiment.

FIG. 15 is a schematic, exploded, oblique view of a portion of a display 1500 showing a reflective light modulator subpixel 1502 and a transmissive light modulator subpixel 1504 according to a still further embodiment. The display 1500 has parts in common with the displays 1200, 1300, 1400 shown in FIGS. 12-14 as indicated by common reference numerals.

Figure 16:
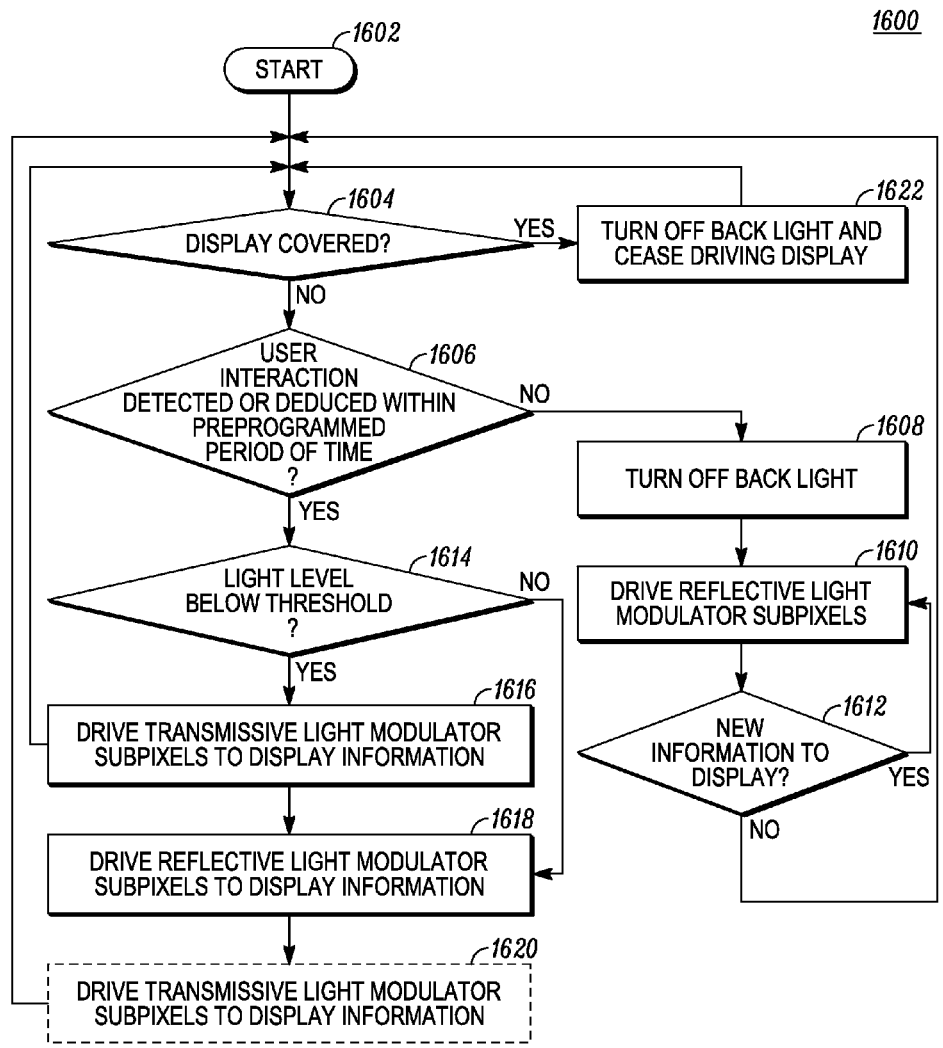
FIG. 16 is a flowchart of a method of operation of the device shown in FIG. 1 according to an embodiment.

FIG. 16 is a flowchart of a method 1600 of operation of the device 100 shown in FIG. 1 according to an embodiment. After the start 1602, the next block 1604 is a decision block the outcome of which depends on whether the display 102 of the device 100 is covered. For example the display 102 may be covered if the user has placed the device 100 in a pocket or placed the device 100 face down on a table. Detection of whether or not the display 102 is covered may be accomplished using the touch sensor 310, the light sensor 342, the camera 344, or by emitting an audio signal from the earpiece speaker 322 and analyzing the resulting audio signal received by microphone 328. Of course, alternative methodologies may be supported, such as a Hall effect sensor and a cover with a magnet. If the outcome of decision block 1604 is affirmative meaning that the display 102 is covered then the method 1600 branches to block 1622 in which the back light 340 is turned off and the device 100 ceases driving the display 102.

If, on the other hand, the outcome of decision block 1604 is negative meaning that the display 102 is not covered then method 1600 proceeds to decision block 1606, the outcome of which depends on whether user interaction with the device has been detected or deduced within a preprogrammed period of time. The preprogrammed period of time may be static or dynamic, and it may depend on other information such as the most recently-detected user interaction or a user preference setting. User activity can take the form of user's actuation of physical buttons (not shown), accelerometer readings, gyroscope readings, and/or the touch sensor. User interaction can be deduced if, for example, the user has set the device 100 to play a video, and face detection software running on the device detects a nearby face in images captured by the camera 344. If the outcome of decision block 1606 is negative meaning that no user interaction has been detected or deduced within the preprogrammed period of time the method 1600 proceeds to block 1608 in which the back light 340 is turned off and then proceeds to block 1610 in which the reflective light modulator subpixels 408, 508, 608, 708, 814 are driven to display content such as text and graphics.

Although the user is not actively interacting with the device 100 it is useful for the device 100 to display certain information such as, for example, the time of day, a user's calendar event, notification of a communication received by the device 100 such as a text, email, voicemail, or telephone call, or notification from a social networking website. Displaying such information may be accompanied by an alert, such as an audio alert or a vibratory alert. Alternatively the back light can be momentarily turned on and transmissive modulator subpixels momentarily operated to form some image as a form of alert.

Although the user is not actively using the device, displaying information using the reflective light modulator subpixels, allows the user (in an adequately lit environment) to quickly glance at the display 102 in order to be informed of the displayed information even when the back light is not on. The method 1600 can of course be implemented with a display having pixels such as shown in FIG. 5 that include in-pixel memory cells 520, 522, 524, 526 and thus which have low power consumption when the pixel state is not quickly changing. This provides for an always-on display of certain information notwithstanding the limited stored energy (e.g., battery energy) available in a portable device such as smartphone or tablet computer. Certain information such as the time of day can be updated periodically, e.g., every minute.

Decision block 1612 tests if there is new information to display. If so the method 1600 loops back to block 1610 in order to display the new information. New information may be received from the server computer 204 via the network(s) 202 or be generated internally by the device 100. If the outcome of decision block 1612 is negative meaning that there is no new information to display, the method 1600 returns to decision block 1604 or another block or may exit from the flow.

When it is determined in decision block 1606 that user interaction has been detected or deduced within the preprogrammed period of time the method 1600 proceeds to decision block 1614 the outcome of which depends on whether a currently detected ambient light level is below a preprogrammed threshold. The ambient light level can be sensed using the light sensor 342 or the camera 344. If the light level is below the preprogrammed threshold then the method 1600 proceeds to block 1616 in which the transmissive light modulator subpixels 402, 404, 406, 502, 504, 506, 602, 604, 606, 702, 704, 706, 808, 810, 812, 1036 are driven to display information. Concurrently, the back light 340 will be turned on. According to certain embodiments the reflective light modulator subpixels 408, 508, 608, 708, 814, 1038 will not be driven if the light level is below the threshold as determined in decision block 1614.

If, on the other hand, it is determined in decision block 1614 that the light level is not below the preprogrammed threshold then the method 1600 proceeds to block 1618 in which the reflective light modulator subpixels 408, 508, 608, 708, 814, 1038 are driven to display information, and optionally in block 1620 the transmissive light modulator subpixels 402, 404, 406, 502, 504, 506, 602, 604, 606, 702, 704, 706, 808, 810, 812, 1036 are also driven to display information. If the transmissive light modulator subpixels are driven the back light 340 will be turned on otherwise the back light 340 will be turned off. One or more programs implementing the method 1600 can be stored in the program memory 312 and executed by the processor 304.

The device 100 may also be provided with a control program that allows a user to selectively set the device to an e-reader mode in order to save power while preserving readability in well lit settings, e.g., indoors in an adequately lit room or outdoors on a sunny day. In the e-reader mode the back light 340 is turned off, the reflective light modulator subpixels are operated to display information and the transmissive light modulator subpixels are not operated.

Figure 17:
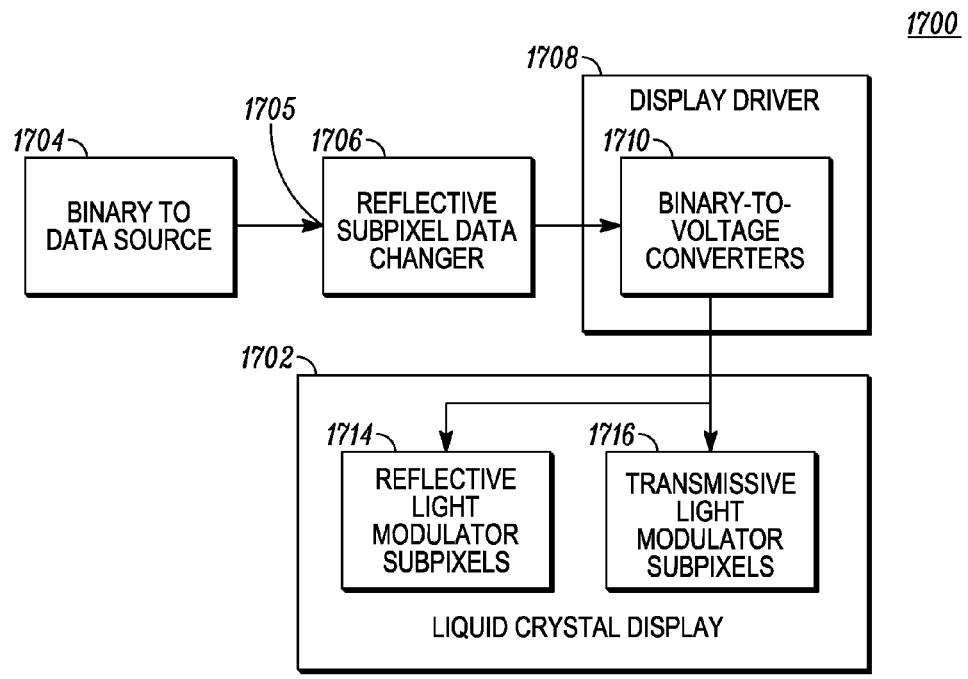
FIG. 17 is a schematic block diagram of a system including a display according to an embodiment.

FIG. 17 is a schematic block diagram of a system 1700 including a display 1702 according to an embodiment. The system 1700 may be implemented in the device 100 shown in FIGS. 1-3. The system 1700 includes a binary data source 1704. The binary data source 1704 may take the form of an image data decoder, video data decoder, or a software module that generates data to display a graphical user interface. For example image data may be encoded in a compressed video or image file format from which the decoder will extract RGB subpixel brightness values (e.g., 8 bit values in the range 0 to 255).

The binary data source 1704 is coupled to an input 1705 of a reflective subpixel data changer 1706, which modifies the data that will be used to control the reflective light modulator subpixels. The reflective subpixel data changer 1706 can be implemented in hardware or software, for example, as a program that is stored in the program memory 312 and executed by the processor 304. Data that will be used to control transmissive light modulator pixels can be passed through the reflective subpixel data changer 1706 without alteration. (According to an alternative the data that will be used to control the transmissive subpixels is modified by a transmissive subpixel value changer and the data that will be used to control the reflective subpixels is passed through the transmissive subpixel value changer without modification.)

The reflective subpixel data changer 1706 is coupled to a display driver 1708 that includes a set of binary-to-voltage converters 1710, e.g., one for each column of the display. The reflective display driver 1708 is coupled to the display 1702 that includes a set of reflective light modulator subpixels 1714 and a set of transmissive light modulator subpixels 1716.

The binary-to-voltage converters 1710 are similar to digital-to-analog converters (D/A), but differ from digital-to-analog converters in that the voltage that they produce is not a linear function input binary value. Rather the binary-to-voltage converters 1710 are designed and in some cases configurable to produce a nonlinear binary to voltage conversion. (Alternatively, standard D/A converters can be used and the nonlinearity implemented before conversion in the digital domain.) The reasons for the nonlinearity are two-fold. One reason is that liquid crystal displays also respond nonlinearly, in terms of brightness as a function of voltage. A second reason is that that nonlinearity implemented in the display driver 1708 is designed to combine with the nonlinearity in the liquid crystal display to produce a response that obeys or at least closely approximates a nonlinear display gamma function.

For example a given display system may designed to control brightness in response to input binary value in a manner that is described by:

$$\text{Brightness} \propto \left(\frac{BPV}{255}\right)^\gamma \quad \text{Equ. 1}$$

where BPV is the binary pixel value ranging from 0-255 and γ is an exponent, typically set to 2.2 that controls the nonlinear response of the display. The value of 255 is for 8 bit pixel values, and may be changed if the binary pixel values have a different number of bits.

Light modulation by the display itself can be described by:

$$\text{Brightness} = F_{display}(\text{voltage}) \quad \text{Equ. 2}$$

where voltage is the voltage applied to subpixel control electrode. $F_{display}$ two can take to form of a polynomial fit, spline fit, or look up table. $F_{display}$ is in general nonlinear. The form (shape) of $F_{display}$ can be found using liquid crystal display simulation software, based on LCD theory or determined by taking actual measurements using a real display.

The operation of the driver can be described by:

$$\text{voltage} = F_{driver}(BPV) \quad \text{Equ. 3}$$

The overall response of the system made up of the display 1702 in combination with the display driver 1708 which is described by EQU. 1 is described by the composition of EQU. 2 describing the operation of the display with EQU. 3 describing the operation of the driver.

There are practical (e.g., cost) advantages to designing the display 1702 (e.g., 1100, FIG. 11) in which the transmissive light modulator subpixels 1136 and the reflective light modulator subpixels 1138 respond substantially differently to input voltages. For example as discussed, from a practical manufacturing point of view it is desirable to use a substantially constant thickness spacer layer 1108 shown in FIG. 11 as opposed to the variable thickness spacer layer 1008 shown in FIG. 10. However, as discussed above, in the case of FIG. 11 the optical path lengths for transmitted and reflected light are substantially different and this leads to different response of the reflective 1138 and transmissive 1136 subpixels to control voltages. Additionally, the reflective and transmissive subpixels may respond differently because they are of different designs as in the case of the embodiments shown in FIG. 14 and FIG. 15.

Thus, equation two is different for the transmissive light modulator subpixels 1136, 1204, 1304, 1404, 1504, 1714 and the reflective light modulator subpixels 1138, 1202, 1302, 1402, 1502, 1716. However, the problem of different responses of the two types of subpixels is addressed by the provision of the reflective subpixel data changer 1706. The purpose of the reflective subpixel data changer 1706 is to compensate for differences in how each type of subpixel responds to voltages. The reflective subpixel data changer 1706 changes the binary data for the reflective subpixels 1714 so that both the reflective light modulator subpixels 1714 and the transmissive light modulator subpixels 1716 will approximately respond according to equation 1, despite the fact that their functioning is described by different forms of equation 2. Thus in this embodiment the same driver configuration described by equation 3 can be used for driving both the reflective light modulator subpixels 1714 and the transmissive light modulator subpixels 1716. This allows an unmodified commercially available driver to be used.

Figure 18:
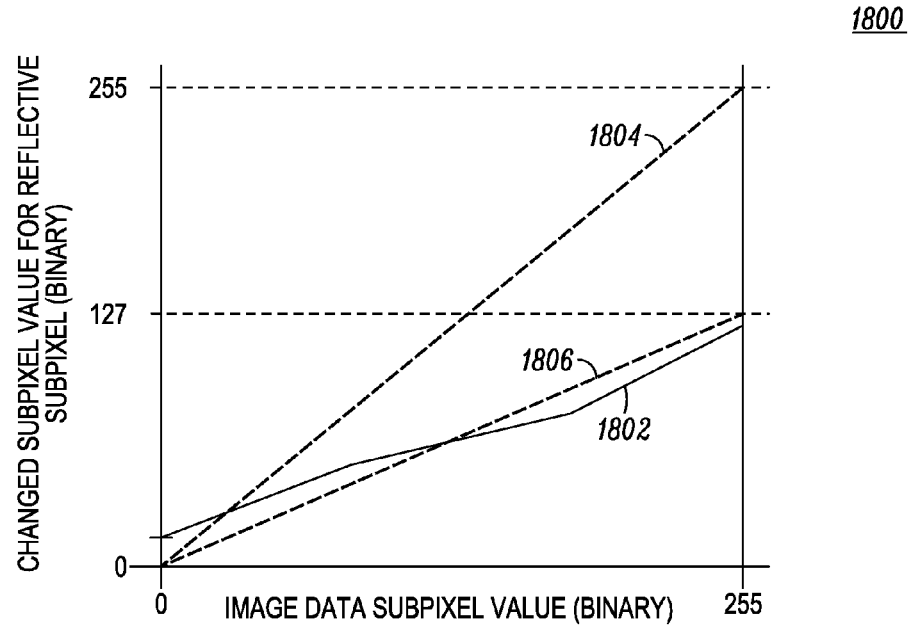
FIG. 18 is a graph including a plot illustrating the alteration of binary subpixel values for driving a reflective modulator subpixel.

FIG. 18 is a graph 1800 including a plot 1802 illustrating the alteration of binary subpixel values for driving a reflective modulator subpixel. The abscissa represent the output of the binary data source 1704 which is input into the reflective subpixel value changer 1706 and the ordinate represents the output of the reflective subpixel value changer 1706. Both axes cover a binary range of 0 to 255.

Considering the display 1100 shown in FIG. 11 in approximate sense we can describe the difference between the reflective light modulator subpixel 1138 and the transmissive light modulator subpixel 1136 as due to the fact that the optical path in the former is twice as that in the latter. Thus assuming, for example a normally black configuration, to first order, we may approximate the voltages necessary to achieve a certain fraction of maximum brightness from the reflective light modulator subpixel 1138 as being half of what would be necessary from the transmissive light modulator subpixel 1136.

The dashed line 1804 represents the identity function which would signify that no change is made to subpixel binary brightness values. The dashed line 1806 represents halving the input binary subpixel values, corresponding to the approximation described above. In certain embodiments, for example in certain embodiments that have an equal or substantially equal thickness of liquid crystal material in both the reflective light modulator subpixels 1714 and the transmissive light modulator subpixels 1716, the reflective subpixel value changer 1706 simply bit shifts the binary subpixel to be used for the reflective subpixel by one bit to the right in order to divide the value by two.

The solid line 1802 represents a possible input-output function of the reflective subpixel value changer 1706 which is not described by a single linear relation throughout its range (although it is piecewise linear). In the present context the identity function 1804 and the halving function are considered to follow a single linear relation throughout their range even though the input domain is discrete and the output values are quantized. Such an input-output function may be used to compensate for differences in how reflective and transmissive subpixels modulate light (described by equation 2) that cannot be equalized simply by dividing binary subpixel values by two. We provide an analysis of the requisite input-output function of the reflective subpixel value changer 1706.

Firstly, to determine appropriate binary-to-voltage function for the converters 1710, we take the composition of the right hand sides of equation 2 and equation 3 and set it equal to the right hand side of equation 1. Here we use an added subscript 't' to specify that the version of equation 2 (the display brightness vs. voltage function) is for the transmissive subpixels. We obtain:

$$\left(\frac{BPV}{255}\right)^\gamma = F_{display,t}(F_{driver}(BPV)) \qquad \text{Equ. 4}$$

$F_{display,t}$ is a function known by theory, simulation or measurement.

We apply the inverse of $F_{display,\ t}$, denoted $F^{-1}_{display,\ t}$ to both sides, switch the left and right sides of the resulting equation and thereby obtain an ideal driver function for the transmissive light modulator subpixels:

$$F_{driver,t}(BPV) = F^{-1}_{display,t}\left(\left(\frac{BPV}{255}\right)^\gamma\right) \qquad \text{Equ. 5}$$

Now, an actual display driver integrated circuit will not always be able to reproduce an arbitrary binary-to-voltage function exactly, but does have several configuration settings that may be used to obtain a good approximation. We denote the approximation that may be obtained $\tilde{F}_{driver,t}$ where:

$$\tilde{F}_{driver,t}(BPV) \approx F_{driver,t}(BPV) \qquad \text{Equ. 6}$$

For the embodiment shown in FIG. 17, for the reflective subpixels, in order to determine a suitable functional form describing the operation of the reflective subpixel value changer 1706, we again take the composition of the right hand sides of equation 2 and equation 3 and set it equal to the right hand side of equation 1. In this case we still use $\tilde{F}_{driver,t}$ because we will use the same driver with the same binary-to-voltage converters but we use a version of $F_{display}$ which is based on theory, measurements or simulation of the reflective light modulator subpixels and which we denote $F_{display,\ r}$. Also, in lieu of BPV as the argument of $\tilde{F}_{driver,t}$ we insert a function $F_{change}$ of BPV, where $F_{change}$ represents the output as a function of input for the reflective subpixel value changer 1706. Thus, we obtain:

$$\left(\frac{BPV}{255}\right)^\gamma = F_{display,r}(\tilde{F}_{driver,t}(F_{change}(BPV))) \qquad \text{Equ. 7}$$

We apply the inverse of $F_{display,\ r}$, denoted $F^{-1}_{display,\ r}$ to both sides and then apply the inverse of $\tilde{F}_{driver,t}$ denoted $\tilde{F}^{-1}_{driver,t}$ to both sides in order to obtain the an expression for $F_{change}$, which is:

$$F_{change} = [\tilde{F}^{-1}_{driver,t}(F^{-1})]_{display,r}\left(\left(\frac{BPV}{255}\right)^\gamma\right)) \qquad \text{Equ. 8}$$

The value of $F_{change}$ which is calculated will be rounded to the nearest whole number. In certain embodiments the reflective subpixel value changer will implement $F_{change}$. $F_{change}$ can be implemented in a look up table using the processor 304 and program memory 304, using a Field Programmable Gate Array (FPGA), using an Application Specific Integrated Circuit (ASIC) or using another type of circuit.

In the embodiment shown in FIG. 17, the reflective subpixel value changer 1706 in combination with the display driver 1708 which includes the binary-voltage converters 1710 make up a circuit that implements two distinct binary-to-voltage conversion function. One of the binary to voltage conversion functions is used to generate voltages that drive the transmissive light modulator subpixels 1716 and the second of the binary to voltage conversion functions is used to generate voltages that drive the reflective light modulator subpixels 1714. As the display 1702 is scanned by the display driver 1708 voltages generated through the first binary-to-voltage conversion function are coupled to the reflective subpixels 1714 by column data lines (e.g., 410, 412, 414, 416) and voltages generated through the second binary to voltage conversion function are coupled to transmissive subpixels 1716 through column data lines (e.g., 410, 412, 414, 416).

Figure 19:
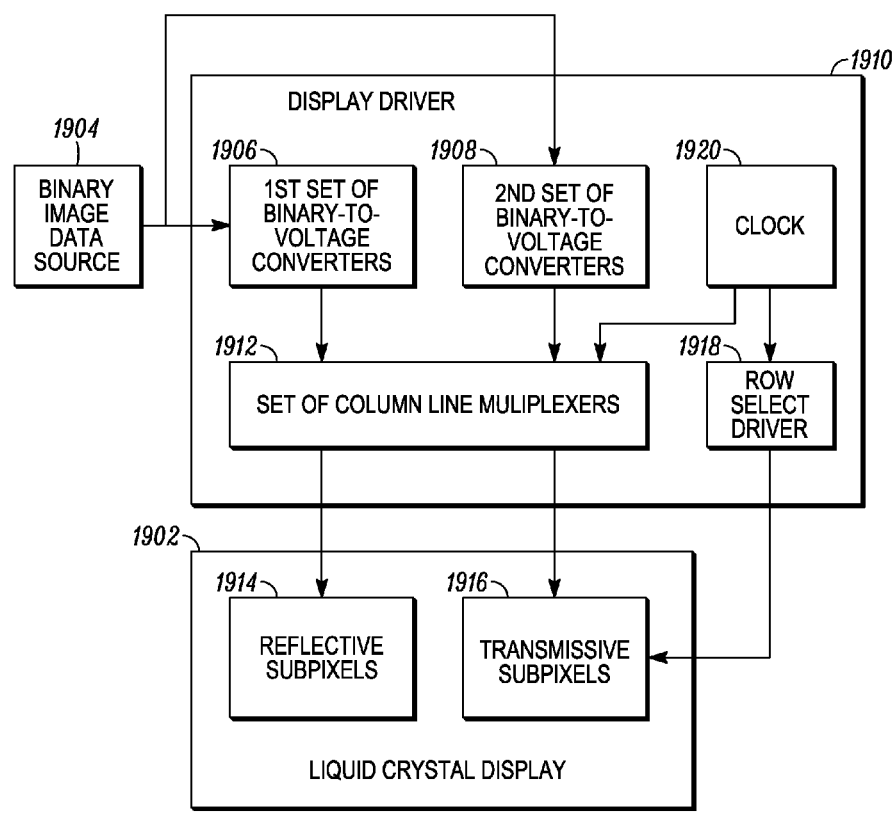
FIG. 19 is a schematic block diagram of a system including a display according to another embodiment.

FIG. 19 is a schematic block diagram of a system 1900 including a display 1902 according to another embodiment. The system 1900 includes a binary data source 1904 coupled to a first set of binary-to-voltage converters 1906 and a second set of binary-to-voltage converters 1908 of a display driver 1910. The first set of binary-to-voltage converters 1906 and the second set of binary-to-voltage converters 1908 are coupled through a set of column line multiplexers 1912 to column lines (not shown) of the display that couple to reflective subpixels 1914 and transmissive subpixels 1916 of the display 1902. The first set of binary-to-voltage converters 1906 are configured to produce voltages as a function of binary input (see equation 10 below) suitable for driving reflective subpixels and the second set of binary-to-voltage converters 1908 are configured to produce voltages as a function of binary (see equation 6 above) suitable for driving transmissive subpixels. The particular form of the binary-to-voltage input/output function for the first set of binary-to-voltage converters 1906 can be arrived at in the same manner used to obtain equation 6, however in the case of the reflective subpixels, $F^{-1}_{display,\ r}$ will be used in lieu of $F^{-1}_{display,\ t}$. Hence:

$$F_{driver,r}(BPV) = F^{-1}_{display,r}\left(\left(\frac{BPV}{255}\right)^\gamma\right) \qquad \text{Equ. 9}$$

and $$\tilde{F}_{driver,r}(BPV) = F_{driver,r}(BPV) \qquad \text{Equ. 10}$$

Each multiplexer in the set of multiplexers 1912 selectively couples one of the first set of binary-to-voltage converters 1906 or one of the second set of binary-to-voltage converters 1908 to a column line that it serves. The selection is based on whether a subpixel in the column and in a currently selected row is a transmissive or reflective. A row select driver 1918 of the display driver 1910 is also coupled to the display 1902. A clock 1920 of the display driver 1910 (or an external clock) is coupled to the set of column line multiplexers 1912 and the row select driver 1918. Within a given column, a given row may include a reflective subpixel or a transmissive subpixel. The system depicted in FIG. 19 is suitable for displays having pixels such as shown in FIG. 6 and FIG. 7 where each column data line serves both reflective subpixels and transmissive subpixels. In other cases such as shown in FIG. 5 and FIG. 9 where each column data line serves only one type of subpixel (i.e., reflective or transmissive) the set of column line multiplexers 1912 are not necessary. The display driver 1902 is a circuit that implements two distinct binary-to-voltage conversion function. The two distinct binary-to-voltage conversion functions do not produce equal voltages for all input binary values. In fact, in certain cases they produce equal voltages for only a few binary values or for no binary values at all.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of display equipped devices described herein. The non-processor circuits may include, but are not limited to, a radio receiver, a radio transmitter, signal drivers, clock circuits, power source circuits, and user input devices. As such, these functions may be interpreted as steps of a method to display and thereby communicate information. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While certain embodiments described herein include a plurality of pixels arranged in a two dimensional (2-D) surface, it is noted that the 2-D surface may be flexible so that it may be bent and become a 2-D surface embedded in three dimensional space.

In the foregoing specification, specific embodiments have been described. However, one of ordinary skill in the art appreciates that various modifications and changes can be made without departing from the scope of teachings hereby provided as set forth in the claims below. Accordingly, the specification and figures are to be regarded in an illustrative rather than a restrictive sense, and all such modifications are intended to be included within the scope of that which is delineated by the appended claims. The benefits, advantages, solutions to problems, and any element(s) that may cause any benefit, advantage, or solution to occur or become more pronounced are not to be construed as a critical, required, or essential features or elements of any or all the claims. The meets and bounds are defined solely by the appended claims including any amendments made during the pendency of this application and all equivalents of those claims as issued.

We claim:

1. A method of operating a personal electronic device that has:
   at least one subsystem for detecting user activity;
   a microprocessor, coupled to the at least one subsystem;
   a liquid crystal display, coupled to the microprocessor, including a plurality of pixels arranged in a 2-D surface, wherein each pixel comprises:
      a colored subpixel with a transmissive light modulator, the colored subpixel having a first input for receiving a first light modulation signal; and
      a second subpixel with a reflective light modulator, the second subpixel having a second input for receiving a second light modulation signal, and
   a back light coupled to the transmissive light modulator;
   the method comprising:
   turning off the back light and continuing to provide the second light modulation signal to the second input and ceasing to provide the first light modulation signal to the first input, by the microprocessor, in response to the at least one subsystem not detecting user activity for a given period of time;
   determining, by the microprocessor, that there is new information to be displayed on the liquid crystal display;
   changing the first light modulation signal and the second light modulation signal based on the new information;
   providing the changed second light modulation signal to the second input;
   providing the changed first light modulation signal to the first input and turning on the back light for a second period of time that is shorter than the given period of time; and
   after the second period of time, turning off the back light and continuing to provide the changed second light modulation signal to the second input and ceasing to provide the changed first light modulation signal to the first input.

2. The method of operating the personal electronic device according to claim 1 wherein the second light modulation signal is generated according to information stored in a memory that is physically located under the reflective light modulator.

3. The method of operating the personal electronic device according to claim 2 wherein the information stored in the memory is based on a time of day.

4. The method of operating the personal electronic device according to claim 2 wherein the information stored in the memory is based on a calendar event.

5. The method of operating the personal electronic device according to claim 2 wherein the information stored in the memory is stored in response to receipt of a communication received by the personal electronic device.

6. The method of operating the personal electronic device according to claim 5 wherein the communication is selected from the group consisting of a telephone call, an email, a text, a voice mail or a notification from a social networking website.

* * * * *